(12) United States Patent
Pardikes

(10) Patent No.: US 11,242,434 B2
(45) Date of Patent: Feb. 8, 2022

(54) SUPER-ACTIVATION OF EMULSION POLYMERS

(71) Applicant: Ecolab USA Inc., St. Paul, MN (US)

(72) Inventor: Dennis Pardikes, Palos Park, IL (US)

(73) Assignee: Ecolab USA Inc., St. Paul, MN (US)

( * ) Notice: Subject to any disclaimer, the term of this patent is extended or adjusted under 35 U.S.C. 154(b) by 322 days.

(21) Appl. No.: 15/326,330

(22) PCT Filed: Jul. 16, 2015

(86) PCT No.: PCT/US2015/040714
§ 371 (c)(1),
(2) Date: Jan. 13, 2017

(87) PCT Pub. No.: WO2016/011232
PCT Pub. Date: Jan. 21, 2016

(65) Prior Publication Data
US 2017/0198107 A1 Jul. 13, 2017

Related U.S. Application Data

(60) Provisional application No. 62/025,769, filed on Jul. 17, 2014.

(51) Int. Cl.
*C08J 3/05* (2006.01)

(52) U.S. Cl.
CPC ............. *C08J 3/05* (2013.01); *C08J 2333/26* (2013.01)

(58) Field of Classification Search
CPC ........................................................ C08J 3/05
See application file for complete search history.

(56) References Cited

U.S. PATENT DOCUMENTS

| | | | |
|---|---|---|---|
| 5,323,017 A | | 6/1994 | Pardikes |
| 5,372,421 A | * | 12/1994 | Pardikes ................ B01F 3/088 137/7 |
| 5,470,150 A | * | 11/1995 | Pardikes ................ B01F 3/088 137/565.15 |
| 5,677,375 A | | 10/1997 | Rifi et al. |
| 5,730,937 A | | 3/1998 | Pardikes |
| 6,120,742 A | | 9/2000 | Pardikes |
| 6,884,867 B2 | | 4/2005 | Pardikes |
| 2003/0156490 A1 | * | 8/2003 | Pardikes ................ B01F 3/088 366/136 |

FOREIGN PATENT DOCUMENTS

| | | |
|---|---|---|
| EP | 0473356 | 3/1992 |
| GB | 2192806 | 1/1988 |

OTHER PUBLICATIONS http://www.csgnetwork.com/specific_gravity_viscosity_liquids.html; 2018.*
Lubrizol "Viscosity of Carbopol Polymers in Aqueous Systems" Technical Data Sheet, 2010.*
European Patent Office Search Report for Application No. 15822076.4 dated Mar. 15, 2018, 6 pages.
International Search Report and Written Opinion for Application No. PCT/US2015/040714 dated Oct. 20, 2015 (8 pages).
International Preliminary Report on Patentability for Application No. PCT/US2015/040714 dated Jan. 17, 2017 (6 pages).
European Patent Office Action for Application No. 15822076.4 dated Jan. 2, 2019 (3 pages).

* cited by examiner

*Primary Examiner* — Wenwen Cai
(74) *Attorney, Agent, or Firm* — Leydig, Voit & Mayer, Ltd.

(57) ABSTRACT

A method for the super-activation of emulsion polymers is provided. The method includes carrying out a one to three-step polymer activation process to form an activated polymer-diluent mixture, the steps selected from (a)-(d): (a) premixing the first polymer-diluent mixture at a predetermined pressure to form a second polymer-diluent mixture; (b) blending the first polymer-diluent mixture or the second polymer-diluent mixture with a blending device to form a blended polymer-diluent mixture; (c) (i) recycling the blended polymer-diluent mixture to be blended as in step (b) or premixed as in step (a) at a predetermined pressure; or (ii) recycling the second polymer-diluent mixture to be premixed as in step (a) at a predetermined pressure; and (d) reducing the pressure in a portion of the blended polymer-diluent mixture or the second polymer-diluent mixture to relax the polymer and form a relaxed polymer-diluent mixture.

20 Claims, 9 Drawing Sheets

SUPER-ACTIVATION OF EMULSION POLYMERS

CROSS-REFERENCE TO RELATED APPLICATIONS

This application claims priority to U.S. Provisional Application No. 62/025,769, filed Jul. 17, 2014, and is herein incorporated by reference in its entirety.

BACKGROUND

Emulsion polymers can be classified by their molecular weight and charge. These polymers include medium to high molecular weight polymers that have either a positive (cationic) or negative (anionic) charge. The magnitude of each polymer's charge can be classified as high, medium or low. Additionally, these polymers are either linear or branched with regard to their molecular structure. The possible combination of these variables (molecular weight, charge, branching) is enormous. Accordingly, each emulsion polymer is designed for specific applications related to its molecular weight, charge, and structure.

For example, medium to high molecular weight, high charge cationic polymers are used in wastewater treatment, while lower charge, high molecular weight cationic polymers are employed in papermaking applications, and higher charge, high molecular weight anionic polymers are used as mining flocculent. Polymers used for these emulsion applications require an input of energy for their activation and use.

In general, higher molecular weight polymers require the most mixing energy to activate, while lower molecular weight polymers require substantially less energy. The activation methods described in U.S. Pat. Nos. 5,323,017 and 5,372,421 provide the necessary amount of mixing energy followed by a period of quiescence for proper activation of these emulsion polymers.

The methods described in U.S. Pat. Nos. 5,323,017 and 5,372,421 are 4-step processes that use unheated diluent to activate polymers. These systems are designed primarily as batch systems which require additional aging or holding time for the polymers to fully hydrate once they are processed through these devices. These systems have been employed in-line, without aging, but at the loss of polymer performance and value.

U.S. Pat. No. 6,884,867 discloses the use of heated diluent to offset the aging time by driving the hydration reaction in a quicker manner. This use of heated diluent and the energy input derived from heating virtually eliminates the need for holding tanks and allows the polymer to be sent directly to the process. This process is appropriate where the in-line activity of the polymer closely matches the activity of a fully aged polymer prepared by conventional means, in order to provide a cost effective treatment program that eliminates the capital expense of added holding tanks and additional pumping means. However, this method requires a 4-step activation process of the polymer.

SUMMARY

Disclosed are methods and systems for preparing polymers for use in selected processes (e.g., papermaking, wastewater treatment, mining). The methods include a super-activation process.

In one aspect, the super-activation process comprises: heating a diluent to an elevated temperature; combining a polymer and the heated diluent to form a first polymer-diluent mixture, wherein the first polymer-diluent mixture has a first concentration of polymer to diluent; carrying out a one to three-step polymer activation process to form an activated polymer-diluent mixture, the steps selected from (a)-(d): (a) premixing the first polymer-diluent mixture at a predetermined pressure to form a second polymer-diluent mixture; (b) blending the first polymer-diluent mixture or the second polymer-diluent mixture with a blending device to form a blended polymer-diluent mixture; (c) (i) recycling the blended polymer-diluent mixture to be blended as in step (b) or premixed as in step (a) at a predetermined pressure; or (ii) recycling the second polymer-diluent mixture to be premixed as in step (a) at a predetermined pressure; and (d) reducing the pressure in a portion of the blended polymer-diluent mixture or the second polymer-diluent mixture to relax the polymer and form a relaxed polymer-diluent mixture; diluting the activated polymer-diluent mixture, said diluted activated polymer-diluent mixture having a temperature lower than said elevated temperature and a second concentration of polymer to diluent lower than the first concentration; wherein the activated polymer-diluent mixture is selected from: the second polymer-diluent mixture, the blended polymer-diluent mixture, and the relaxed polymer-diluent mixture; and passing the diluted activated polymer-diluent mixture to an output, preferably passing the diluted activated polymer-diluent mixture through a mixer to an output.

DETAILED DESCRIPTION

Figure 1:
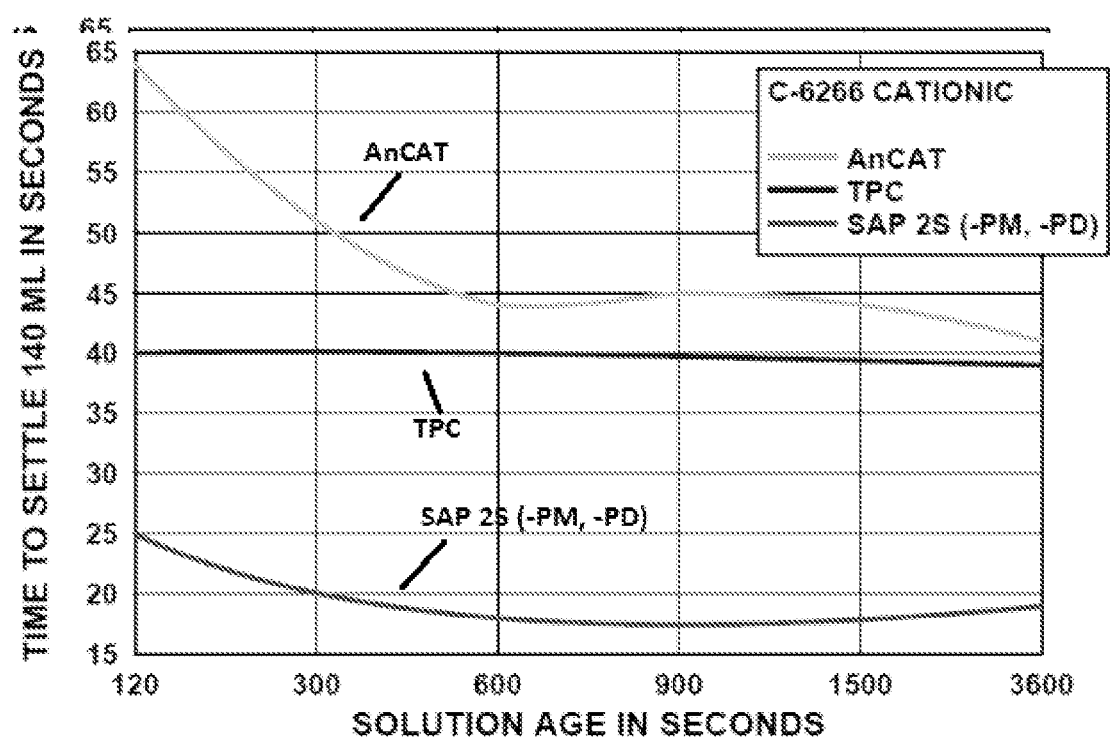
FIG. 1 is a graph comparing the results of super-activation of a cationic polyacrylamide versus standard and thermal activation of the cationic polyacrylamide.

Disclosed are methods and systems for super-activation of emulsion polymers. The methods can include a determination of the appropriate amount of heat and mechanical energy that is required for activation of the emulsion polymers. The methods can provide energy efficient processes of activating emulsion polymers that are improved over existing methods of polymer activation. The processes can unexpectedly improve polymer activity to levels beyond the capabilities of existing processes.

Super-activation can be achieved via a synergistic process in which one or more steps are removed from an existing polymer activation process. The polymers that may be super-activated include a wide range of polymers of varied molecular weights and charge densities. The methods and systems are designed such that one of skill may implement a combination of activation steps described herein to determine the specific steps that, when employed, will result in super-activation of the polymer.

The super-activation methods are expected to have an important and immediate impact in the marketplace. In water and wastewater treatment plants the improvement in solids recovery and lower chemical costs per ton of dry solids can result in less chemical waste to landfills. Other benefits include reduced landfill and transportation costs, and less electrical power consumed per ton of processed waste solids. Specifically, in papermaking wet end chemistry, a super-activated polymer can yield improved retention of paper fibers while improving sheet drainage with lower chemical usages.

I. Definitions of Terms

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "super-activation" and "super-activate" as used herein, refers to a polymer molecule in a form that yields a higher reactive state and/or hydrodynamic volume as compared to active levels anticipated by conventionally hydrated measured endpoints. In this super-activated state the polymer exhibits increased efficiencies in the areas of charge destabilization and floc formation (bridging) for heightened performance in liquid solids separation applications.

The term "charge density" as used herein, is defined as the charge carrying units per molecular weight of monomer. Thus, the charge density of a polymer may be determined for any polymer. For example, the molecular weight of the monomer units of polyethylenimine is 43, and each monomer carries one atom (nitrogen), which may carry a charge. Thus, the charge density of polyethylenimine is $\frac{1}{43}=0.0233$. Charge density values disclosed herein are reported with no units, but are understood to follow the foregoing definition.

The term "derated centrifugal pump," as used herein, may refer to derating a centrifugal pump by changing the impeller diameter or width to reduce flow and pressure; limiting the flow to the pump by regulating the water prior to entry; and/or varying the RPM of the impeller.

As used in the specification and the appended claims, the singular forms "a," "an" and "the" include plural references unless the context clearly dictates otherwise. The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Any recited range described herein is to be understood to encompass and include all values within that range, without the necessity for an explicit recitation.

II. Method of Super-Activating Polymers

Disclosed is a method of super-activating polymers. The method may include one or more of the processes described in U.S. Pat. Nos. 5,323,017, 5,372,421, and 6,884,867, each of which are incorporated herein by reference in their entirety. These references disclose four-step activation that is subdivided into intermediate stages from low to high energy: premix (PM), recycle (R), pressure drop (PD) and blending (B).

In order to "super-activate" medium to high molecular weight cationic and anionic polymers, a blending device with selectable energy (shear) attributes is preferred. This device can be a mixing chamber or pump with bladed rotors that has fixed or variable speed drives to control its rotations per minute (RPM), configured in such a way as to create pressure on the discharge. Alternatively, the device can create backpressure or reverse pressure across the flow in order to mix the high temperature diluent and polymer with enough force to produce a homogeneous blend, while at the same time releasing the hydrophilic polymer gel particles from the continuous oil phase without damaging or shearing effect.

If too much shear is present, the polymer, when raised to high temperatures, can be damaged through a mechanism similar to hydrolysis or mechanical fracturing of the molecular backbone. This is generally not a problem when the polymer diluent is cool. The lower energy environment provided by the cool diluent adds a level of protection to the polymer during the mixing stage.

The blending device can be a flow limited bladed rotor device such as a derated centrifugal pump, an inline blender, a multiple stage centrifugal pump, or any device that imparts momentary energy to the polymer solution. A controllable motor speed device such as an AC frequency drive, DC drive or variable speed mechanical drive can be employed to change the speed of a rotor device or the like to help control the wide range of energy adjustments useful for reaching optimum super-activation.

The speed of the bladed rotor may be about 400-4900 RPM with a preferred range of about 2500-3500 RPM. For example, a super-activated polymer may be provided by use of a polymer and diluent heated to 52° C. (125° F.) combined with a blending device having a rotor speed of 2100 RPM. In another example, a super-activated polymer may be provided by use of a polymer and diluent heated to 21° C. (70° F.) combined with a blending device having a rotor speed of 2900 RPM. In yet another example, a super-activated polymer may be provided by use of a polymer and diluent heated to 38° C. (100° F.) combined with a blending device having a rotor speed of 3450 RPM. After blending, the polymer solution is discharged. Alternatively, or in combination with a variable speed drive would be the addition of the individual or 3 combined steps of premix, recycle and pressure drop to add to or subtract from the activation energy as required to achieve a super activated state.

Various ratios of temperature and mechanical energy can be used to achieve super-activation. A processing system with broad latitude for adjusting mechanical energy input and temperature can be used to achieve super-activation for a variety of polymers. This can allow the user to establish the correct mixing/temperature ratio, which may be specific to the type of polymer processed.

The super-activated polymer can then be post diluted with a cold water source as it exits the make down unit to an output. This additional post-activation process may be useful for improving drainage and retention performance of the polymer.

A. Polymer

The polymers that may be super-activated by the disclosed process may be medium to high molecular weight polymers. The polymers that may be super-activated by the disclosed process may be non-ionic, cationic or anionic, and may possess high charge or low charge densities. The polymers may be copolymers, such as block copolymers, graft copolymers, and random copolymers.

The polymers that may be super-activated by the disclosed process may be medium molecular weight polymers. The medium molecular weight polymers may have a molecular weight of about 20,000 g/mole to about 500,000 g/mole. The medium molecular weight polymers may have a weight average molecular weight of at least 20,000 g/mole, at least 30,000 g/mole, at least 40,000 g/mole, at least 50,000 g/mole, at least 60,000 g/mole, at least 70,000 g/mole, at least 80,000 g/mole, at least 90,000 g/mole, at least 100,000 g/mole, at least 150,000 g/mole, at least 200,000 g/mole, at least 250,000 g/mole, at least 300,000 g/mole, at least 350,000 g/mole, at least 400,000 g/mole, or at least 450,000 g/mole. The medium molecular weight polymers may have a weight average molecular weight of less than 500,000 g/mole, less than 450,000 g/mole, less than 400,000 g/mole, less than 350,000 g/mole, less than 300,000 g/mole, less than 250,000 g/mole, less than 200,000 g/mole, less than 150,000 g/mole, less than 100,000 g/mole, or less than 50,000 g/mole.

The polymers that may be super-activated by the disclosed process may be high molecular weight polymers. The high molecular weight polymers may have a molecular weight of about 500,000 g/mole to about 50,000,000 g/mole. The high molecular weight polymers may have a weight average molecular weight of at least at least 500,000 g/mole, at least 600,000 g/mole, at least 700,000 g/mole, at least 800,000 g/mole, at least 900,000 g/mole, at least 1,000,000 g/mole, at least 1,100,000 g/mole, at least 1,200,000 g/mole, at least 1,300,000 g/mole, at least 1,500,000 g/mole, at least 1,600,000 g/mole, at least 1,700,000 g/mole, at least 1,800,000 g/mole, at least 1,900,000 g/mole, at least 2,000,000 g/mole, at least 2,500,000 g/mole, at least 3,000,000 g/mole, at least 3,500,000 g/mole, at least 4,000,000 g/mole, at least 4,500,000 g/mole, at least 5,000,000 g/mole, at least 10,000,000 g/mole, or at least at least 20,000,000 g/mole.

The cationic polymers may have high charge density or low charge density. The charge density of the cationic polymers may be 0.001 to 10. The charge density of the cationic polymers may be at least 0.0001, at least 0.0005, at least 0.001, at least 0.005, at least 0.01, at least 0.05, at least 0.1, at least 0.5, at least 1, at least 2, at least 5, or at least 9. The charge density of the cationic polymers may be 0.0001 to 1. The charge density of the cationic polymers may be less than 0.0002, less than 0.0005, less than 0.001, less than 0.01, less than 0.1, less than 0.5, or less than 0.9.

The anionic polymers may have high charge density or low charge density. The charge density of the anionic polymers may be 0.001 to 10. The charge density of the anionic polymers may be at least 0.0001, at least 0.0005, at least 0.001, at least 0.005, at least 0.01, at least 0.05, at least 0.1, at least 0.5, at least 1, at least 2, at least 5, or at least 9. The charge density of the anionic polymers may be 0.0001 to 1. The charge density of the anionic polymers may be less than 0.0002, less than 0.0005, less than 0.001, less than 0.01, less than 0.1, less than 0.5, or less than 0.9.

The polymers that may be super-activated by the disclosed process may be high molecular weight high charge cationic polymers. The polymers that may be super-activated by the disclosed process may be medium molecular weight high charge cationic polymers. The polymers that may be super-activated by the disclosed process may be high molecular weight low charge cationic polymers. The polymers that may be super-activated by the disclosed process may be medium molecular weight low charge cationic polymers.

The polymers that may be super-activated by the disclosed process may be high molecular weight high charge anionic polymers. The polymers that may be super-activated by the disclosed process may be medium molecular weight high charge anionic polymers. The polymers that may be super-activated by the disclosed process may be high molecular weight low charge anionic polymers. The polymers that may be super-activated by the disclosed process may be medium molecular weight low charge anionic polymers.

1. Cationic Polymer

"Cationic polymer" means a polymer having an overall positive charge. The cationic polymers of this disclosure include polymers composed entirely of cationic monomers and polymers composed of cationic and nonionic monomers and polymers composed of cationic and anionic monomers. Cationic polymers also include condensation polymers of epichlorohydrin and a dialkyl monoamine or polyamine and condensation polymers of ethylenedichloride and ammonia or formaldehyde and an amine salt. Cationic polymers of this disclosure include solution polymers, emulsion polymers, dispersion polymers and structurally modified polymers as described in PCT US01/10867. Cationic polymers can be formed from one or more ethylenically unsaturated cationic monomers, optionally with one or more nonionic monomers, optionally with one or more anionic monomers, or a combination thereof.

"Cationic monomer" means a monomer which possesses a net positive charge. Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylactylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl, methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride.

The cationic monomers which may be used in the polymers of the disclosure may be chosen from monomers of the acrylamide, acrylic, vinyl, allyl or maleic type having a quaternary ammonium functional group. Cationic monomers include quaternary ammonium functionalities such as quaternized dimethylaminoethyl acrylate (ADAME), quaternized dimethylaminoethyl methacrylate (MADAME), acrylamidopropyltrimethylammonium chloride (APTAC) methacrylamidopropyltrimethylammonium chloride (MAPTAC), diallyldimethyl ammonium chloride (DADMAC), (meth)acrylamidopropyltrimethyl ammonium chloride ((M)APTAC), quaternary aminomethyl(meth)acrylamide (QA-MAM), methacryloxyethyltrimethyl ammonium chloride (METAC), acryloxyethyltrimethyl ammonium chloride (AETAC), acrylamidoethylpropyl trimethyl ammonium chloride (AMPTAC), diethyldiallyl ammonium chloride (DEDAAC) and trimethylallyloxyethyl ammonium chloride (TAAC). Non-ionic monomers include but are not limited to alkyl substituted or unsubstituted (meth)acrylamides, alkyl esters of (meth)acrylic acids, hydroxyalkyl esters of (meth)acrylic acids, and amino alkyl esters of (meth)acrylic acids. Zwitterionic monomers include but are not limited to monomers of unsaturated carboxyl, sulfoxyl or sulfate-substituted amines.

Preferred water treatment polymers are sulfonated or carboxylated copolymer molecules having, as a backbone, acrylic acids and acrylamides and/or their corresponding esters, such as polyacrylic acid and sulfonated copolymers of acrylic acid.

Exemplary cationic polymers include the following: poly(N-methylvinylamine), polyallylamine, polyallyldimethylamine, polydiallylmethylamine, polydiallyl dimethyl ammonium chloride (pDADMAC), polyvinylpyridinium chloride, poly(2-vinylpyridine), poly(4-vinylpyridine), polyvinylimidazole, poly(4-aminomethylstyrene), poly(4-aminostyrene), polyvinyl(acrylamide-co-dimethylaminopropylacrylamide), polyvinyl(acrylamide-co-dimethyaminoethylmethacrylate), polyethyleneimine, polylysine, DAB-Am and PAMAM dendrimers, polyaminoamides, polyhexamethylenebiguandide, polydimethylamine-epichlorohydrine, aminopropyltriethoxysilane, N-(2-aminoethyl)-3-aminopropyltrimethoxysilane, N-trimethoxysilylpropyl-N,N,N-trimethylammonium chloride, bis(trimethoxysilylpropyl)amine, chitosan, grafted starch, the product of alkylation of polyethyleneimine by methylchloride, the product of alkylation of polyaminoamides with epichlorohydrine, cationic polyacrylamide with cationic monomers, dimethyl aminoethyl methacrylate methyl chloride (METAC), ionenes, silanes and mixtures thereof, polyaminoamides, polyethyleneimine, polyvinylamine, polydimethylamine-epichlorohydrin, polyhexamethylenebiguanide, poly-[2-(2-ethoxy)-ethoxyethlyl-guanidinium] chloride, polysaccharides such as cationic guar (e.g., guar derivatized with glycidyltrimethylammonium chloride) and other natural gum derivatives, and synthetic polymers such as copolymers of acrylamide. The latter include copolymers of acrylamide with diallyldimethylammonium chloride (DADMAC), acryloyloxyethyltrimethylammonium chloride, methacryloyloxyethyltrimethyl ammonium methylsulfate, methacryloyloxyethyltrimethyl ammonium chloride (MTMAC) or methacrylamidopropyltrimethyl ammonium chloride, bishexamethylenetriamine-epichlorohydrin, diethylenetriamine-epichlorohydrin, hexamethylenediamine-epichlorohydrin, triethylenetetraamine-epichlorohydrin, and tetraethylenepentaamine-epichlorohydrin.

2. Anionic Polymer

"Anionic polymer" means a polymer having an overall negative charge. The anionic polymers of this disclosure include polymers composed entirely of anionic monomers and polymers composed of anionic and nonionic monomers and polymers composed of anionic and cationic monomers. Anionic polymers of this disclosure include solution polymers, emulsion polymers, dispersion polymers and structurally modified polymers.

"Anionic monomer" means a monomer which possesses a negative charge above a certain pH range. Representative anionic monomers include acrylic acid, and its salts, including, but not limited to sodium acrylate, and ammonium acrylate, methacrylic acid, and its salts, including, but not limited to sodium methacrylate, and ammonium methacrylate, 2-acrylamido-2-methylpropanesulfonic acid (AMPS), the sodium salt of AMPS, sodium vinyl sulfonate, styrene sulfonate, maleic acid, and its salts, including, but not limited to the sodium salt, and ammonium salt, sulfonate, itaconate, sulfopropyl acrylate or methacrylate or other water-soluble forms of these or other polymerisable carboxylic or sulfonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, and the like.

The anionic polymer may be anionically modified forms of lignin and hemicellulose, such as are obtained for example by oxidation, sulfonation or carboxymethylation. Oxidized and sulfonated lignins and hemicelluloses are by-products of the pulping process and are normally present in unbleached pulps useful in this invention. The naturally present lignins and hemicellulose may also be modified by conventional synthetic processes such as oxidation, sulfonation and carboxymethylation. The anionic polymer may also be polysaccharides such as pectin, carrageenan, alginate, xanthan gum, and modified celluloses such as carboxymethylcellulose, gum acacia, gum ghatti, gum karaya, gum tragacanth, locust bean gum, guar gum, psyllium seed gum, quince seed gum, larch gum (arabinogalactans), stractan gum, agar, furcellaran, modified starches, gellan gum, fucoidan, and the like. An exemplary complex coacervate shell comprises whey protein isolate and pectin.

The anionic polymers may also include anionic step-growth polymers, chain-growth polymers, polysaccharides, naturally occurring aromatic polymers and modifications thereof. Examples of suitable anionic step-growth polymers include anionic benzene-based and naphthalene-based condensation polymers, naphthalene-sulphonic acid based condensation polymers and naphthalene-sulphonate based condensation polymers, and addition polymers (i.e. polymers obtained by step-growth addition polymerization such as anionic polyurethanes). Examples of suitable anionic chain-growth polymers include anionic vinyl addition polymers such as acrylate- and acrylamide-based polymers comprising anionic or potentially anionic monomers like (meth) acrylic acid and polystyrenesulphonic acid. Examples of suitable naturally occurring aromatic polymers and modifications thereof include modified naturally occurring aromatic anionic polymers such as lignin-based polymers, sulfonated lignins, lignosufonates, kraft lignin, sulfonated kraft lignin, and tannin extracts. Further examples of other suitable anionic organic polymers include those disclosed in WO 02/12626.

The anionic polymers may include copolymers of acrylamide with sodium acrylate and/or 2-acrylamido 2-methyl-propane sulfonic acid (AMPS) or an acrylamide homopolymer that has been hydrolyzed to convert a portion of the acrylamide groups to acrylic acid. Suitable anionic polymers also may include homopolymers and copolymers of acrylic acid (AA), homopolymers and copolymers of methacrylic acid (MAA), homopolymers and copolymers of 2-acrylamido-2-methylpropane sulfonic acid (AMPSA), homopolymers and copolymers of N-methacrylamidopropyl N,N-dimethyl amino acetic acid, N-acrylamidopropyl N,N-dimethyl amino acetic acid, N-methacryloyloxyethyl N,N-dimethyl amino acetic acid, N-acryloyloxyethyl N,N-dimethyl amino acetic acid, a polyacrylamide, a polyacrylate, a poly(meth)acrylate, a poly 2-acrylamide-2-methylpropoane sulfonic acid, an acrylamide sodium acrylate copolymer, an acrylamide sodium(meth)acrylate copolymer, an acrylamide/ammonium acrylate copolymer, an acrylamide ammonium(meth)acrylate copolymer, an acrylamide sodium 2-acrylamido-2-methylpropane sulfonic acid copolymer, an acrylamide ammonia 2-acrylamido-2-methylpropane sulfonic acid copolymer, a hydrolyzed acrylamide (to acrylic acid) 2-acrylamido-2-methylpropane sulfonic acid copolymer, an acrylamide 2-acrylamido-2-methylpropane sulfonic acid/ammonium acrylate terpolymer, a polydimethylaminoethylacrylate methyl chloride (DM-AEA.MCQ), a polydimethylaminoethylmethacrylate methyl chloride (DMAEM.MCQ), a polydimethylaminoethylmethacrylate methyl sulfate (DMAEM.MSQ), a polydimethylaminoethylacrylate methyl sulfate (DMAEA.MSQ), a polydimethylaminoethylmethacrylate benzyl chloride (DMAEM.BCQ), a polydimethylaminoethylacrylate benzyl chloride (DMAEA.BCQ), a polytrimethylammonium propyl methacrylamide chloride (MAPTAC), a polyacrylamidopropyltrimethylammonium chloride (APTAC), an AcAm-DMAEA.MCQ copolymer, an AcAm-DMAEM.MCQ copolymer, an AcAm-DMAEM.MSQ copolymer, an AcAm-DMAEA.MSQ copolymer, an AcAm-DMAEM.BCQ copolymer, an AcAm-DMAEA.BCQ copolymer, an AcAm-MAPTAC copolymer, or an AcAm-APTAC copolymer.

In certain embodiments, the anionic polymers may be flocculants that include, for example, flocculant-grade homopolymers, copolymers, and terpolymers prepared from monomers. The anionic polymer flocculants may be linear, branched, or crosslinked. The anionic polymer flocculant may be a commercially available flocculant. The anionic polymer flocculants may comprise monomers selected from the group consisting of acrylic acid, methacrylic acid, 2-acrylamido-2-methyl-1-propanesulfonic acid, acrylamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide and salts thereof, for example alkali metal, alkaline earth metal and ammonium salts thereof. In exemplary embodiments, the salts are water soluble. In exemplary embodiments, the salt is an alkali metal salt, for example a lithium salt, a sodium salt, a potassium salt, a rubidium salt, or a cesium salt. In exemplary embodiments, the salt is an alkaline earth metal salt, for example a beryllium salt, a magnesium salt, a calcium salt, a strontium salt or a barium salt.

The anionic synthetic polymers may be formed from one or more ethylenically unsaturated anionic monomers or a blend of one or more anionic monomers with one or more of the nonionic monomers mentioned previously. The anionic monomers include acrylic acid, methacrylic acid, maleic acid, crotonic acid, itaconic acid, vinyl sulfonic acid, allyl sulfonic acid, 2-acrylamido-2-methylpropane sulfonic acid (AMPS), acrylamide, mixtures thereof, and salts thereof.

3. Nonionic Polymer

"Nonionic polymer" means a polymer having no overall charge, or electrically neutral.

"Nonionic monomer" means a monomer which is electrically neutral. Representative nonionic monomers include acrylamide, methacrylamide, N-methylacrylamide, N,N-dimethyl(meth)acrylamide, N,N-diethyl(meth)acrylamide, N-isopropyl(meth)acrylamide, N-t-butyl(meth)acrylamide, N-(2)-hydroxypropyl)methacrylamide, N-methylolacrylamide, N-vinylformamide, N-vinylacetamide, N-vinyl-N-methylacetamide, poly(ethylene glycol)(meth)acrylate, poly (ethylene glycol) monomethyl ether mono(meth)acryate, N-vinyl-2-pyrrolidone, glycerol mono((meth)acrylate), 2-hydroxyethyl(meth)acrylate, 2-hydroxypropyl(meth)acrylate, vinyl methylsulfone, vinyl acetate, glycidyl(meth)acrylate, and the like.

The nonionic polymers may be, but are not limited to: polyvinyl acetate, polyvinyl butyral, a fluorinted polyolefin, fluorinated ethylene propylene, polytetrafluoroethylene, polyvinylidene fluoride, ethyl vinyl acetate, ethylene acrylate, acid modified ethylene acrylate, anhydride modified ethylene acrylate, acid or acrylate modified ethyl vinyl acetate, high density polyethylene, anhydride modified high density polyethylene, linear low density polyethylene, anhydride modified linear low density polyethylene, polypropylene, anhydride modified polypropylene, polyethylene, low density polyethylene, polyvinyl alcohol, an acrylic copolymer, ethyl butyl acrylate, ethyl ethyl acrylate, ethyl methyl acrylate, polyester, and amorphous nylon.

Nonionic polymers include polymers formed from one or more water soluble ethylenically unsaturated nonionic monomers, for instance acrylamide, methacrylamide, hydroxyethyl acrylate and N-vinylpyrrolidone, preferably acrylamide. Nonionic polymers also include alkoxylated multifunctional alcohols.

B. The Method

Disclosed is a polymer super-activation method comprising: heating a diluent to an elevated temperature; combining a polymer and the heated diluent to form a first polymer-diluent mixture, wherein the first polymer-diluent mixture has a first concentration of polymer to diluent;

carrying out a one to three-step polymer activation process to form an activated polymer-diluent mixture, the steps selected from (a)-(d): (a) premixing the first polymer-diluent mixture at a predetermined pressure to form a second polymer-diluent mixture; (b) blending the first polymer-diluent mixture or the second polymer-diluent mixture with a blending device to form a blended polymer-diluent mixture; (c) (i) recycling the blended polymer-diluent mixture to be blended as in step (b) or premixed as in step (a) at a predetermined pressure; or (ii) recycling the second polymer-diluent mixture to be premixed as in step (a) at a predetermined pressure; and (d) reducing the pressure in a portion of the blended polymer-diluent mixture or the second polymer-diluent mixture to relax the polymer and form a relaxed polymer-diluent mixture; diluting the activated polymer-diluent mixture, said diluted activated polymer-diluent mixture having a temperature lower than said elevated temperature and a second concentration of polymer to diluent lower than the first concentration; wherein the activated polymer-diluent mixture is selected from: the second polymer-diluent mixture, the blended polymer-diluent mixture, and the relaxed polymer-diluent mixture; and passing the diluted activated polymer-diluent mixture to an output.

In an embodiment, the disclosed method of super-activating a polymer comprises: heating a diluent to an elevated temperature; combining a polymer and the heated diluent, wherein the combination has an elevated concentration of polymer to diluent; (b) adding the mixture of polymer and diluent to a derated centrifugal pump and blending the mixture; (c) recycling a first portion of the blended mixture at a predetermined pressure; (d) suddenly reducing the pressure to relax the polymer in a second portion of the blended mixture; diluting the mixture to produce both a temperature lower than said elevated temperature and a reduced concentration of polymer to diluent; and passing the diluted mixture through a mixer to an output.

In another embodiment, the disclosed method of super-activating a polymer comprises: heating a diluent to an elevated temperature; combining a polymer and the heated diluent to form a first polymer-diluent mixture, wherein the first polymer-diluent mixture has a first concentration of polymer to diluent; carrying out a three-step polymer activation process to form an activated polymer-diluent mixture, the steps being: (b) blending the first polymer-diluent mixture with a blending device to form a blended polymer-diluent mixture; (c) recycling the blended polymer-diluent mixture to be blended as in step (b); and (d) reducing the pressure in a portion of the blended polymer-diluent mixture to relax the polymer and form a relaxed polymer-diluent mixture; diluting the activated polymer-diluent mixture, said diluted activated polymer-diluent mixture having a temperature lower than said elevated temperature and a second concentration of polymer to diluent lower than the first concentration; wherein the activated polymer-diluent mixture is the relaxed polymer-diluent mixture; and passing the diluted activated polymer-diluent mixture to an output.

In another embodiment, the disclosed method of super-activating a polymer comprises: heating a diluent to an elevated temperature; combining a polymer and the heated diluent, wherein the combination has an elevated concentration of polymer to diluent; (a) premixing the combination of the polymer and the heated diluent by mixing at a predetermined pressure; (c) recycling a first portion of the mixture at the predetermined pressure; (d) suddenly reducing the pressure to relax the polymer in a second portion of the mixture; diluting the mixture to produce both a temperature lower than said elevated temperature and a reduced concentration of polymer to diluent; and passing the diluted mixture through a mixer to an output.

In another embodiment, the disclosed method of super-activating a polymer comprises: heating a diluent to an elevated temperature; combining a polymer and the heated diluent to form a first polymer-diluent mixture, wherein the first polymer-diluent mixture has a first concentration of polymer to diluent; carrying out a three-step polymer activation process to form an activated polymer-diluent mixture, the steps being: (a) premixing the first polymer-diluent mixture at a predetermined pressure to form a second polymer-diluent mixture; (c) recycling the second polymer-diluent mixture to be premixed as in step (a) at a predetermined pressure; and (d) reducing the pressure in the second polymer-diluent mixture to relax the polymer and form a relaxed polymer-diluent mixture; diluting the activated polymer-diluent mixture, said diluted activated polymer-diluent mixture having a temperature lower than said elevated temperature and a second concentration of polymer to diluent lower than the first concentration; wherein the activated polymer-diluent mixture is the relaxed polymer-diluent mixture; and passing the diluted activated polymer-diluent mixture to an output.

In another embodiment, the disclosed method of super-activating a polymer comprises: heating a diluent to an elevated temperature; combining a polymer and the heated diluent, wherein the combination has an elevated concentration of polymer to diluent; (a) premixing the combination of the polymer and the heated diluent by mixing at a predetermined pressure; (b) adding the mixture of polymer and diluent to a derated centrifugal pump and blending the mixture; (d) suddenly reducing the pressure to relax the polymer in a second portion of the blended mixture; diluting the mixture to produce both a temperature lower than said elevated temperature and a reduced concentration of polymer to diluent; and passing the diluted mixture through a mixer to an output.

In another embodiment, the disclosed method of super-activating a polymer comprises: heating a diluent to an elevated temperature; combining a polymer and the heated diluent to form a first polymer-diluent mixture, wherein the first polymer-diluent mixture has a first concentration of polymer to diluent; carrying out a three-step polymer activation process to form an activated polymer-diluent mixture, the steps being: (a) premixing the first polymer-diluent mixture at a predetermined pressure to form a second polymer-diluent mixture; (b) blending the first polymer-diluent mixture or the second polymer-diluent mixture with a blending device to form a blended polymer-diluent mixture; and (d) reducing the pressure in a portion of the blended polymer-diluent mixture to relax the polymer and form a relaxed polymer-diluent mixture; diluting the activated polymer-diluent mixture, said diluted activated polymer-diluent mixture having a temperature lower than said elevated temperature and a second concentration of polymer to diluent lower than the first concentration; wherein the activated polymer-diluent mixture is the relaxed polymer-diluent mixture; and passing the diluted activated polymer-diluent mixture to an output.

In another embodiment, the disclosed method of super-activating a polymer comprises: heating a diluent to an elevated temperature; combining a polymer and the heated diluent, wherein the combination has an elevated concentration of polymer to diluent; (a) premixing the combination of the polymer and the heated diluent by mixing at a predetermined pressure; (b) adding the mixture of polymer and diluent to a derated centrifugal pump and blending the mixture; (c) recycling a first portion of the blended mixture at the predetermined pressure; diluting the mixture to produce both a temperature lower than said elevated temperature and a reduced concentration of polymer to diluent; and passing the diluted mixture through a mixer to an output.

In another embodiment, the disclosed method of super-activating a polymer comprises: heating a diluent to an elevated temperature; combining a polymer and the heated diluent to form a first polymer-diluent mixture, wherein the first polymer-diluent mixture has a first concentration of polymer to diluent; carrying out a three-step polymer activation process to form an activated polymer-diluent mixture, the steps being: (a) premixing the first polymer-diluent mixture at a predetermined pressure to form a second polymer-diluent mixture; (b) blending the first polymer-diluent mixture or the second polymer-diluent mixture with a blending device to form a blended polymer-diluent mixture; and (c) recycling the blended polymer-diluent mixture to be blended as in step (b); diluting the activated polymer-diluent mixture, said diluted activated polymer-diluent mixture having a temperature lower than said elevated temperature and a second concentration of polymer to diluent lower than the first concentration; wherein the activated polymer-diluent mixture is the blended polymer-diluent mixture; and passing the diluted activated polymer-diluent mixture to an output.

In another embodiment, the disclosed method of super-activating a polymer comprises: heating a diluent to an elevated temperature; combining a polymer and the heated diluent, wherein the combination has an elevated concentration of polymer to diluent; (a) premixing the combination of the polymer and the heated diluent by mixing at a predetermined pressure; (b) adding the mixture of polymer and diluent to a derated centrifugal pump and blending the mixture; diluting the mixture to produce both a temperature lower than said elevated temperature and a reduced concentration of polymer to diluent; and passing the diluted mixture through a mixer to an output.

In another embodiment, the disclosed method of super-activating a polymer comprises: heating a diluent to an elevated temperature; combining a polymer and the heated diluent to form a first polymer-diluent mixture, wherein the first polymer-diluent mixture has a first concentration of polymer to diluent; carrying out a two-step polymer activation process to form an activated polymer-diluent mixture, the steps being: (a) premixing the first polymer-diluent mixture at a predetermined pressure to form a second polymer-diluent mixture; and (b) blending the first polymer-diluent mixture or the second polymer-diluent mixture with a blending device to form a blended polymer-diluent mixture; diluting the activated polymer-diluent mixture, said diluted activated polymer-diluent mixture having a temperature lower than said elevated temperature and a second concentration of polymer to diluent lower than the first concentration; wherein the activated polymer-diluent mixture is the blended polymer-diluent mixture; and passing the diluted activated polymer-diluent mixture to an output.

In another embodiment, the disclosed method of super-activating a polymer comprises: heating a diluent to an elevated temperature; combining a polymer and the heated diluent, wherein the combination has an elevated concentration of polymer to diluent; (a) premixing the combination of the polymer and the heated diluent by mixing at a predetermined pressure; (c) recycling a first portion of the mixture at the predetermined pressure; diluting the mixture to produce both a temperature lower than said elevated temperature and a reduced concentration of polymer to diluent; and passing the diluted mixture through a mixer to an output.

In another embodiment, the disclosed method of super-activating a polymer comprises: heating a diluent to an elevated temperature; combining a polymer and the heated diluent to form a first polymer-diluent mixture, wherein the first polymer-diluent mixture has a first concentration of polymer to diluent; carrying out a two-step polymer activation process to form an activated polymer-diluent mixture, the steps being: (a) premixing the first polymer-diluent mixture at a predetermined pressure to form a second polymer-diluent mixture; and (c) recycling the second polymer-diluent mixture to be premixed as in step (a) at a predetermined pressure; diluting the activated polymer-diluent mixture, said diluted activated polymer-diluent mixture having a temperature lower than said elevated temperature and a second concentration of polymer to diluent lower than the first concentration; wherein the activated polymer-diluent mixture is the second polymer-diluent mixture; and passing the diluted activated polymer-diluent mixture to an output.

In another embodiment, the disclosed method of super-activating a polymer comprises: heating a diluent to an elevated temperature; combining a polymer and the heated diluent, wherein the combination has an elevated concentration of polymer to diluent; (a) premixing the combination of the polymer and the heated diluent by mixing at a predetermined pressure; (d) suddenly reducing the pressure to relax the polymer in a second portion of the mixture; diluting the mixture to produce both a temperature lower than said elevated temperature and a reduced concentration of polymer to diluent; and passing the diluted mixture through a mixer to an output.

In another embodiment, the disclosed method of super-activating a polymer comprises: heating a diluent to an elevated temperature; combining a polymer and the heated diluent to form a first polymer-diluent mixture, wherein the first polymer-diluent mixture has a first concentration of polymer to diluent; carrying out a two-step polymer activation process to form an activated polymer-diluent mixture, the steps being: (a) premixing the first polymer-diluent mixture at a predetermined pressure to form a second polymer-diluent mixture; and (d) reducing the pressure in a portion of the second polymer-diluent mixture to relax the polymer and form a relaxed polymer-diluent mixture; diluting the activated polymer-diluent mixture, said diluted activated polymer-diluent mixture having a temperature lower than said elevated temperature and a second concentration of polymer to diluent lower than the first concentration; wherein the activated polymer-diluent mixture is the relaxed polymer-diluent mixture; and passing the diluted activated polymer-diluent mixture to an output.

In another embodiment, the disclosed method of super-activating a polymer comprises: heating a diluent to an elevated temperature; combining a polymer and the heated diluent, wherein the combination has an elevated concentration of polymer to diluent; (b) adding the mixture of polymer and diluent to a derated centrifugal pump and blending the mixture; (c) recycling a first portion of the blended mixture at a predetermined pressure; diluting the mixture to produce both a temperature lower than said elevated temperature and a reduced concentration of polymer to diluent; and passing the diluted mixture through a mixer to an output.

In another embodiment, the disclosed method of super-activating a polymer comprises: heating a diluent to an elevated temperature; combining a polymer and the heated diluent to form a first polymer-diluent mixture, wherein the first polymer-diluent mixture has a first concentration of polymer to diluent; carrying out a two-step polymer activation process to form an activated polymer-diluent mixture, the steps being: (b) blending the first polymer-diluent mixture with a blending device to form a blended polymer-diluent mixture; and (c) recycling the blended polymer-diluent mixture to be blended as in step (b); diluting the activated polymer-diluent mixture, said diluted activated polymer-diluent mixture having a temperature lower than said elevated temperature and a second concentration of polymer to diluent lower than the first concentration; wherein the activated polymer-diluent mixture is the blended polymer-diluent mixture; and passing the diluted activated polymer-diluent mixture to an output.

In another embodiment, the disclosed method of super-activating a polymer comprises: heating a diluent to an elevated temperature; combining a polymer and the heated diluent, wherein the combination has an elevated concentration of polymer to diluent; (b) adding the mixture of polymer and diluent to a derated centrifugal pump and blending the mixture; (d) suddenly reducing the pressure to relax the polymer in a second portion of the blended mixture; diluting the mixture to produce both a temperature lower than said elevated temperature and a reduced concentration of polymer to diluent; and passing the diluted mixture through a mixer to an output.

In another embodiment, the disclosed method of super-activating a polymer comprises: heating a diluent to an elevated temperature; combining a polymer and the heated diluent to form a first polymer-diluent mixture, wherein the first polymer-diluent mixture has a first concentration of polymer to diluent; carrying out a two-step polymer activation process to form an activated polymer-diluent mixture, the steps being: (b) blending the first polymer-diluent mixture with a blending device to form a blended polymer-diluent mixture; and (d) reducing the pressure in a portion of the blended polymer-diluent mixture to relax the polymer and form a relaxed polymer-diluent mixture; diluting the activated polymer-diluent mixture, said diluted activated polymer-diluent mixture having a temperature lower than said elevated temperature and a second concentration of polymer to diluent lower than the first concentration; wherein the activated polymer-diluent mixture is the blended polymer-diluent mixture; and passing the diluted activated polymer-diluent mixture to an output.

In another embodiment, the disclosed method of super-activating a polymer comprises: heating a diluent to an elevated temperature; combining a polymer and the heated diluent, wherein the combination has an elevated concentration of polymer to diluent; (c) recycling a first portion of the mixture at a predetermined pressure; and (d) suddenly reducing the pressure to relax the polymer in a second portion of the mixture; diluting the mixture to produce both a temperature lower than said elevated temperature and a reduced concentration of polymer to diluent; and passing the diluted mixture through a mixer to an output.

In another embodiment, the disclosed method of super-activating a polymer comprises: heating a diluent to an elevated temperature; combining a polymer and the heated diluent, wherein the combination has an elevated concentration of polymer to diluent; (a) premixing the combination of the polymer and the heated diluent by mixing at a predetermined pressure; diluting the mixture to produce both a temperature lower than said elevated temperature and a reduced concentration of polymer to diluent; and passing the diluted mixture through a mixer to an output.

In another embodiment, the disclosed method of super-activating a polymer comprises: heating a diluent to an elevated temperature; combining a polymer and the heated diluent to form a first polymer-diluent mixture, wherein the first polymer-diluent mixture has a first concentration of polymer to diluent; carrying out a one-step polymer activation process to form an activated polymer-diluent mixture, the step being: (a) premixing the first polymer-diluent mixture at a predetermined pressure to form a second polymer-diluent mixture; diluting the activated polymer-diluent mixture, said diluted activated polymer-diluent mixture having a temperature lower than said elevated temperature and a second concentration of polymer to diluent lower than the first concentration; wherein the activated polymer-diluent mixture is the second polymer-diluent mixture; and passing the diluted activated polymer-diluent mixture to an output.

In another embodiment, the disclosed method of super-activating a polymer comprises: heating a diluent to an elevated temperature; combining a polymer and the heated diluent, wherein the combination has an elevated concentration of polymer to diluent; (b) adding the mixture of polymer and diluent to a derated centrifugal pump and blending the mixture; diluting the mixture to produce both a temperature lower than said elevated temperature and a reduced concentration of polymer to diluent; and passing the diluted mixture through a mixer to an output.

In another embodiment, the disclosed method of super-activating a polymer comprises: heating a diluent to an elevated temperature; combining a polymer and the heated diluent to form a first polymer-diluent mixture, wherein the first polymer-diluent mixture has a first concentration of polymer to diluent; carrying out a one-step polymer activation process to form an activated polymer-diluent mixture, the step being: (b) blending the first polymer-diluent mixture or the second polymer-diluent mixture with a blending device to form a blended polymer-diluent mixture; diluting the activated polymer-diluent mixture, said diluted activated polymer-diluent mixture having a temperature lower than said elevated temperature and a second concentration of polymer to diluent lower than the first concentration; wherein the activated polymer-diluent mixture is the blended polymer-diluent mixture; and passing the diluted activated polymer-diluent mixture to an output.

In another embodiment, the disclosed method of super-activating a polymer comprises: heating a diluent to an elevated temperature; combining a polymer and the heated diluent, wherein the combination has an elevated concentration of polymer to diluent; (c) recycling a first portion of the mixture at a predetermined pressure; diluting the mixture to produce both a temperature lower than said elevated temperature and a reduced concentration of polymer to diluent; and passing the diluted mixture through a mixer to an output.

In another embodiment, the disclosed method of super-activating a polymer comprises: heating a diluent to an elevated temperature; combining a polymer and the heated diluent, wherein the combination has an elevated concentration of polymer to diluent; (d) suddenly reducing the pressure to relax the polymer in a second portion of the mixture; diluting the mixture to produce both a temperature lower than said elevated temperature and a reduced concentration of polymer to diluent; and passing the diluted mixture through a mixer to an output.

In another embodiment, the disclosed method of super-activating a polymer comprises: the disclosed method of super-activating a polymer comprises: heating a diluent to an elevated temperature; combining a polymer and the heated diluent to form a first polymer-diluent mixture, wherein the first polymer-diluent mixture has a first concentration of polymer to diluent; carrying out a one-step polymer activation process to form an activated polymer-diluent mixture, the step being: (d) reducing the pressure in a portion of the first polymer-diluent mixture to form a relaxed polymer-diluent mixture; diluting the activated polymer-diluent mixture, said diluted activated polymer-diluent mixture having a temperature lower than said elevated temperature and a second concentration of polymer to diluent lower than the first concentration; wherein the activated polymer-diluent mixture is the relaxed polymer-diluent mixture; and passing the diluted activated polymer-diluent mixture to an output.

In any of the above embodiments, passing the diluted activated polymer-diluent mixture to an output may comprise passing the diluted activated polymer-diluent mixture through a mixer to the output.

The first concentration of polymer to diluent may be, by weight, about 0.1-10% polymer to about 90-99.9% diluent. The first concentration of polymer to diluent may be, by weight, about 0.1-5% polymer to about 95-99.9% diluent. The first concentration of polymer to diluent may be, by weight, about 0.5-6% polymer to about 94-99.5% diluent. The first concentration of polymer to diluent may be, by weight, about 0.5-5% polymer to about 95-99.5% diluent. The first concentration of polymer to diluent may be, by weight, about 0.2-4% polymer to about 96-99.8% diluent. The first concentration of polymer to diluent may be, by weight, about 0.5-4% polymer to about 96-99.5% diluent. The first concentration of polymer to diluent may be, by weight, about 0.5-3% polymer to about 97-99.5% diluent. The first concentration of polymer to diluent may be, by weight, about 0.5-2% polymer to about 98-99.5% diluent. The first concentration of polymer to diluent may be, by weight, about 0.5-1% polymer to about 99-99.5% diluent.

Pressure may be applied as specified in the method. The predetermined pressure may be about 5 psi to about 100 psi, about 5 psi to about 80 psi, about 10 psi to about 80 psi, about 30 psi to about 65 psi, or preferably about 40 psi to about 50 psi.

In addition, increased pressure may also occur as a consequence of implementation of any or all of the activation steps. The additional pressure that may result from implementation of the activation steps may be about 1 psi to about 20 psi, about 1 psi to about 15 psi, about 1 psi to about 10 psi, about 1 psi to about 5 psi, or about 5 psi to about 10 psi.

The first polymer-diluent mixture may have a viscosity in the range of about 100 SSU to about 500,000 SSU, about 100 SSU to about 400,000 SSU, about 100 SSU to about 300,000 SSU, about 100 SSU to about 200,000 SSU, about 300 SSU to about 500,000 SSU, about 300 SSU to about 400,000 SSU, about 300 SSU to about 300,000 SSU, about 300 SSU to about 250,000 SSU, about 1,000 SSU to about 200,000 SSU, or about 250,000 SSU to about 500,000 SSU. The viscosity may be determined by use of a Brookfield Viscometer Model LVT. Spindle numbers: 1, 2, 3 and 4 at RPM ranges 0.3 thru 60 (viscosity dependent) plus ultra-low Brookfield UL adapter for viscosities less than 400 SSU.

The elevated temperature of the process may be about 15° C. to about 60° C., about 20° C. to about 60° C., about 25° C. to about 60° C., about 30° C. to about 60° C., about 35° C. to about 60° C., about 40° C. to about 60° C., about 45° C. to about 60° F., about 50° C. to about 60° C., about 15° C. to about 55° C., about 15° C. to about 50° C., about 15° C. to about 45° C., about 15° C. to about 40° C., about 15° C. to about 35° C., about 15° C. to about 30° C., about 20° C. to about 50° C., about 25° C. to about 50° C., about 30° C. to about 50° C., about 35° C. to about 55° C., about 35° C. to about 50° C., about 25° C. to about 40° C., or about 25° F. to about 35° C.

The blending device used for blending may have a rotor speed of about 500 RPM to about 4000 RPM, about 1000 RPM to about 4000 RPM, about 1500 RPM to about 4000 RPM, about 2000 RPM to about 4000 RPM, about 2500 RPM to about 4000 RPM, about 3000 RPM to about 4000 RPM, about 3500 RPM to about 4000 RPM, about 500 RPM to about 3000 RPM, about 500 RPM to about 2000 RPM, about 500 RPM to about 1000 RPM, about 1000 RPM to about 3000 RPM, about 1000 RPM to about 2000 RPM, about 2000 RPM to about 4000 RPM, or about 2000 RPM to about 3000 RPM.

The second concentration of polymer to diluent may have a concentration, by weight, of about 0.001-5.0% polymer to about 95.0-99.999% diluent. The second concentration of polymer to diluent may have a concentration, by weight, of about 0.001-4.0% polymer to about 96.0-99.999% diluent. The second concentration of polymer to diluent may have a concentration, by weight, of about 0.001-3.0% polymer to about 97.0-99.999% diluent. The second concentration of polymer to diluent may have a concentration, by weight, of about 0.001-2.0% polymer to about 98.0-99.999% diluent. The second concentration of polymer to diluent may have a concentration, by weight, of about 0.001-1.0% polymer to about 99.0-99.999% diluent. The second concentration of polymer to diluent may have a concentration, by weight, of about 0.001-0.5% polymer to about 99.5-99.999% diluent.

As specified in the method, pressure in a portion of the blended polymer-diluent mixture or the second polymer-diluent mixture may be reduced to relax the polymer and form a relaxed polymer-diluent mixture. The quantity of pressure reduced in this step may equal the amount of pressure applied earlier in the process, such as for example the predetermined pressure of step (a). The quantity of pressure may also equal the amount of inherent pressure that results from implementation of any or all of the activation steps. The quantity of pressure may equal both the applied pressure and the inherent pressure.

The present invention has multiple aspects, illustrated by the following non-limiting examples.

III. Examples

A. Evaluation of Polymer Activation

A reliable method for evaluating the level of activation or hydration of a polymer following its initial processing is the settling test. The settling test uses feedstock from the process or a laboratory prepared clay slurry that will be acted upon by the polymer. The measurement is more exact than other methods, as it is a direct indicator of the polymer's reactivity on the substrate and is based on the rate of settling in a column of known volume.

1. Procedure for Settling Tests

2% Kaolin Slurry Preparation:

Measure 340 grams of Actimin kaolin into an agitated vessel containing 17,038 grams of water. Allow the sample to mix for 12-24 hrs. The kaolin clay slurry will be sufficiently hydrated at this point to conduct settling tests.

Procedure for 250 ml Polymer Settling Tests:

Fill a 250 mL graduated cylinder with of 2% kaolin slurry. Depending on polymer charge type and density add 2-6 mL of a 0.25% weight on weight concentration of polymer sample derived from lab bench prep or from the apparatus. Cover the cylinder and invert 2-3 times for adequate dispersion. Place the cylinder on a flat surface and immediately track (with stopwatch) the time to reach the 110 ml mark on the cylinder. (Displacement of 140 mL the flocculated slurry) Record value and repeat test at 5 min intervals for the first 15 minutes and the at 10 minute intervals for the next 30 to 60 minutes.

2. Results of Settling Tests

FIG. 1 is a graph comparing the results of super-activation of a cationic polyacrylamide versus standard and thermal activation of the cationic polyacrylamide. Shown in the figure are the rates of hydration of the cationic polyacrylamide. The polymer was activated via unheated (AnCAT) and heated (TPC) 4 step activation processes, as well as a two-step super-activation process (SAP 2S; blend, recycle; no premix, no pressure drop). The settling material used was a kaolin 2.5% clay slurry prepared and mixed for 12 hours. The endpoint, or maximum activity, for the unheated solution (AnCAT), yielded final maximum settling rates after 1 hour. These rates did not further improve after 8 hours, which is considered the useful life of the solutions. The endpoint of the TPC solution reactions (measured instantaneously) effectively equaled the aged product in reactivity level after only 1 minute. The super-activated polymer showed an instantaneous and much improved settling time over both of the aforementioned processes.

Figure 2:
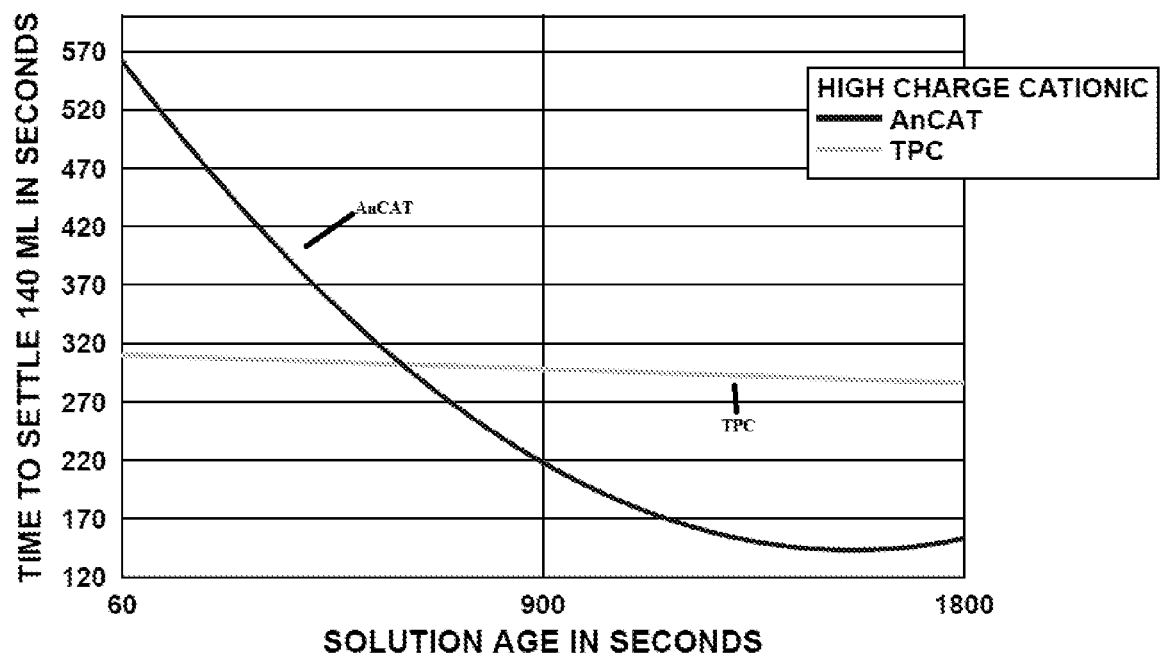
FIG. 2 is a graph reporting the settling rates of high molecular weight high charge cationic polymer solutions.

FIG. 2 shows that the polymer from the 4 step heated process (TPC) was only 53% as active when compared to the standard unheated 4 step process (AnCAT). The energy from the combination of heated diluent and mechanical shear forces applied to this type of polymer caused sufficient impairment to the polymer to reduce its effectiveness. Because this outcome was not observed in the unheated (AnCAT) processing, it is inferred that a mixing energy threshold must be surpassed when adding heat to the activation equation that is not normally present when using unheated diluent. Furthermore, exceeding this threshold reduced the effectiveness of the polymer. Anticipating that the two energy inputs of heat and mechanical shear must be additive, a testing protocol was initiated to quantify the threshold by systematically removing layers of mechanical shear in the 4 step process while maintaining the other variables (flow, concentration, temperature, etc) constant.

3. Super-Activation of Polymers

Figure 3:
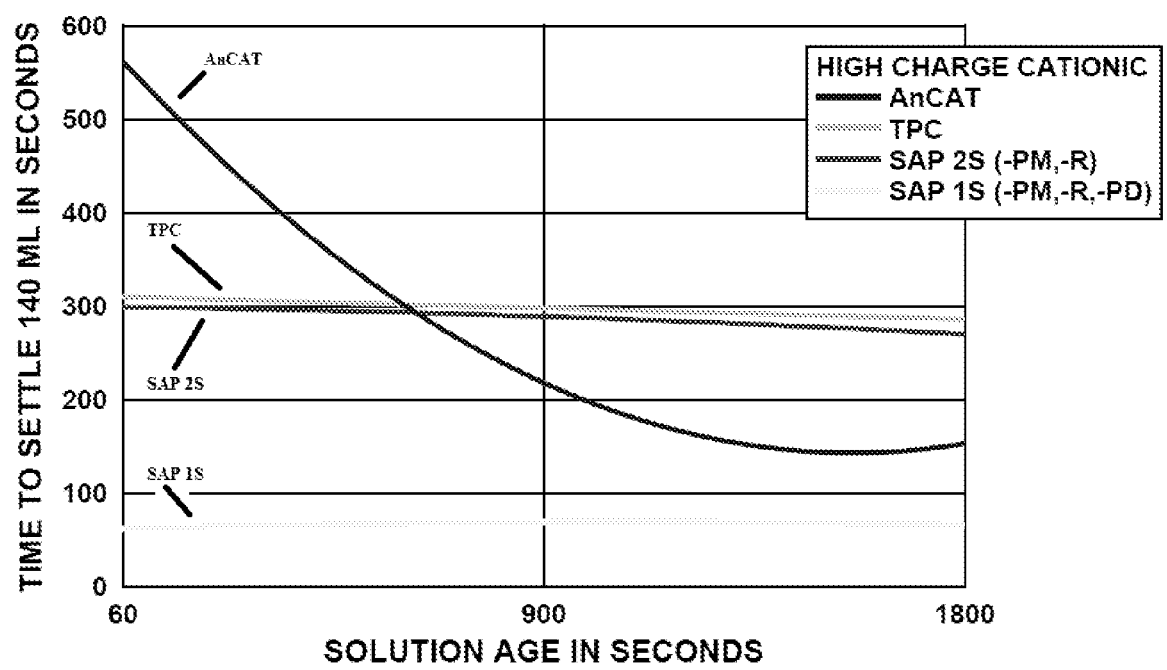
FIG. 3 is a graph comparing the results of super-activation of a cationic polyacrylamide versus standard and thermal activation of the cationic polyacrylamide.

As described above, the existing 4-step process can be broken down into intermediate stages: premix (PM), blending (B), recycle (R), and pressure drop (PD). As FIG. 3 illustrates, eliminating the premix step in the activation of a high charge cationic polymer (removing the static mixer from the manifold block) showed little improvement in settling time. Eliminating the recycle step (by blocking the recycle conduit orifice in the manifold) in combination with removing the premix step showed some improvement over removal of only the premix step (SAP 2S; blending, pressure drop; no premix, no recycle). The exclusion of the pressure drop, by removing the back pressure regulator altogether, in combination with removing the premix and recycle steps showed the most improvement and an unexpected result (SAP 1S; blending; no premix, no recycle, no pressure drop). The polymer exceeded the level of activation anticipated by the standard hydration reaction. In effect, the reactivity of the polymer molecule was at a higher electrostatic potential level than would be predicted by the customary reaction endpoint at equilibrium under standard conditions. This result is super-activation.

Figure 4:
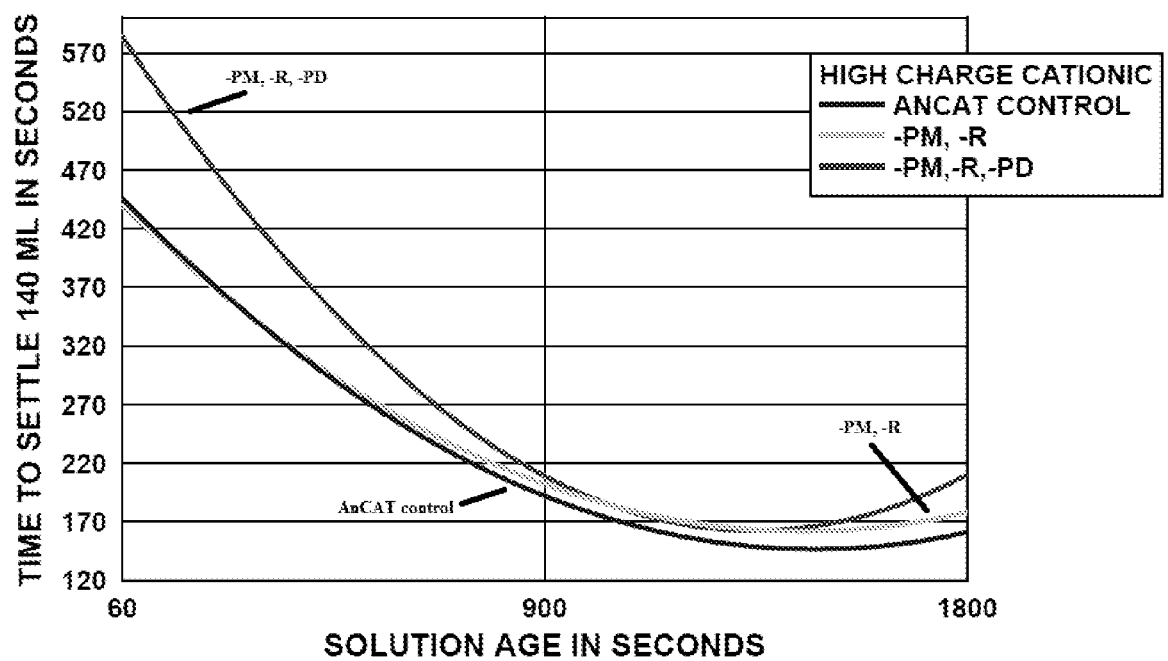
FIG. 4 is a graph comparing the results of a high molecular weight cationic polyacrylamide with standard activation under a series of processing conditions.

To establish a comparative control standard, the previous experiment using the same protocol with 4-step processing system on the same high charge cationic polymer was performed. However, no heat energy was employed. The results are shown in FIG. 4.

The hydration curve following each step removal showed no tendency for accelerated hydration and more specifically, no evidence of activation beyond what normally would be expected. As each step was removed, the performance of the polymer was slightly diminished. The premix and recycle steps had a relatively minor effect on the hydration curve while the pressure drop had a more substantial impact.

Figure 5:
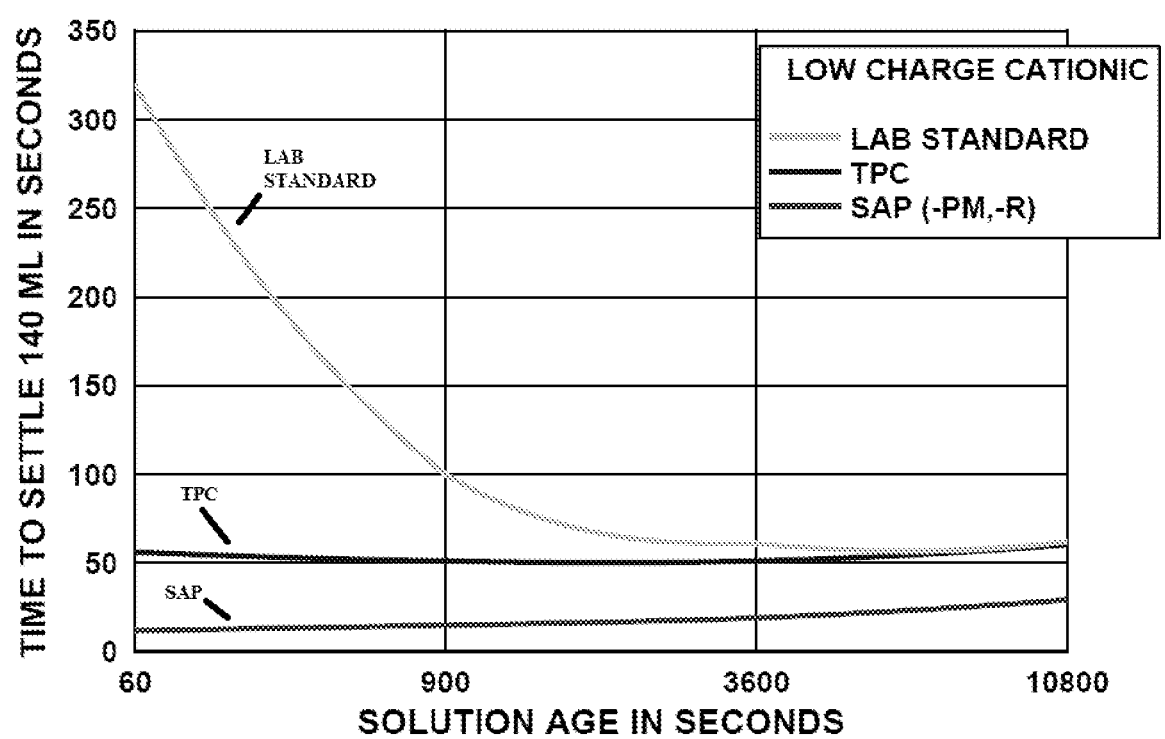
FIG. 5 is a graph comparing the results of super-activation of a cationic polyacrylamide versus lab standard and thermal activation of the cationic polyacrylamide.
Figure 6:
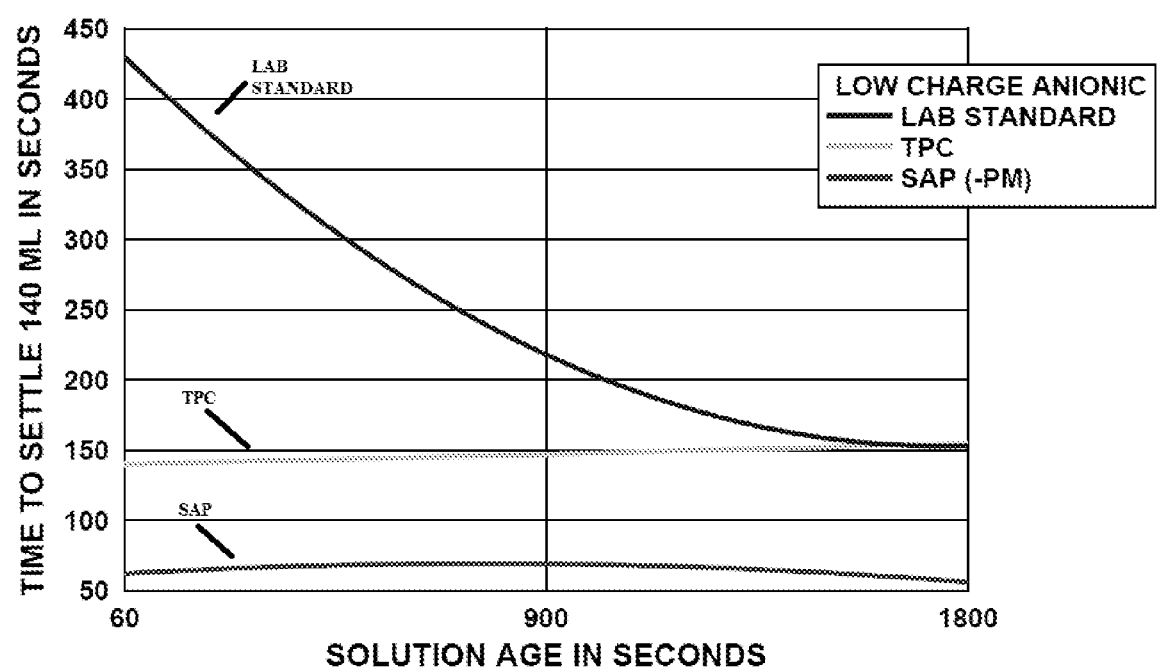
FIG. 6 is a graph comparing the results of super-activation of an anionic polyacrylamide versus lab standard and thermal activation of the anionic polyacrylamide.

FIG. 5 and FIG. 6 illustrate the magnitude of super-activation on cationic and anionic polymers. The super-activated HMW cationic and anionic polymers (SAP) exhibited substantially higher activity than either the fully aged lab control standard or the heated 4-step process (TPC).

The lab standard of FIG. 5 and FIG. 6 refers to emulsion polymer samples prepared by conventional mixing protocols according to the following procedure: Water (399 g) was added to a 600 mL beaker and stirred via a lab prop mixer (400-500 RPM). The polymer (1 g) was added by syringe to the water and the mixture was stirred for 30 seconds. The prop mixer speed was reduced to 200 RPM and continued to stir for 30 min. After discontinuing mixing, the mixture was then allowed to age 15-30 minutes.

These results indicate that the addition of heat is required for super-activation to occur. The addition of heat also changes the quantity of mixing energy required. These results also suggest that raising the temperature of the diluent modifies the nature of mixing required, and that once the proper ratio of heat energy to mixing energy has been established for a particular polymer, the level of activation will exceed its normal potential. If activation energy is defined as the amount of energy necessary to start the chemical reaction, then super-activation can be characterized as the increased polymer activity level that exceeds its expected hydration reaction endpoint.

In order to determine the scope of such a system design, a series of tests were run with diverse polymers of varying molecular weights, charge types, charge densities, concentrations and diluent temperatures. The system for processing these polymers included capabilities for adjusting the number of processing steps, increasing or decreasing the rotor speed and controlling a wide range of diluent temperatures. These parameters are summarized in Table 1.

TABLE 1

| System Specifications | Prototype Super-Activation |
|---|---|
| Number of Processing Steps | 1 to 3 User Selectable |
| Type of Processing Steps | Blending, Recycle, Pressure Drop |
| Diluent Temperature Range | 60° F.-140° F. |
| Blending Pump Speed Range | 500-4000 RPM |
| Primary Concentration Range | 0.4-5.0% |
| Secondary Concentration Range | 0.001-2.0% |

The tests were conducted with the polymers summarized in Table 2.

TABLE 2

| Polymer | Charge | Charge Density | Molecular Weight |
|---|---|---|---|
| SNF 140 CT | Cationic | Low | High |
| BCK 533 | Anionic | Low | High |
| Clarifloc 9545 | Cationic | High | High |
| Clarifloc 1363 | Cationic | High | high |

The results of the polymer tests and conditions for super-activation are shown in Table 3. Each polymer required a variety of processing inputs to achieve a super-activated state. The activity was compared with a control lab standard and quantified with a settling test of 2.5% kaolin clay slurry. The polymer was considered super-activated when the instantaneous non-aged solution settling rate exceeded the aged solution lab standard. This value ranged from about 10% to as high as 100%.

With one exception, all tested polymers achieved a super-activated state. Additionally, none of the polymers super-activated to 100% of their potential when primary concentrations were above 3%. Through experimentation, multiple changes to temperature and mechanical mixing energy were enacted in an effort to rise above this concentration upper limit. Thus, adjustments to the processing system can be made in order to achieve super-activation results.

TABLE 3

| Polymer | Steps | RPM | 1° Conc. | Viscosity[2] | Temp | % Super-Activation[1] |
|---|---|---|---|---|---|---|
| BCK 533 | B, R, PD | 3450 | 3% | 180 | 53° C. (128° F.) | 100 |
| BCK 533 | B | 3450 | 4% | 486 | 27° C. (80° F.) | 15 |
| Clarifloc 1363 | B | 2850 | 3% | 98 | 21° C. (70° F.) | 0 |
| Clarifloc 1363 | B | 2850 | 4% | 325 | 21° C. (70° F.) | 0 |
| SNF 140 CT | B, R | 3450 | 3% | 62 | 55° C. (131° F.) | 100 |
| SNF 140 CT | B, R | 3450 | 4% | 230 | 27° C. (80° F.) | 40 |
| Clarifloc 9545 | B | 2850 | 3% | 65 | 27° C. (80° F.) | 100 |
| Clarifloc 9545 | B | 2850 | 4% | 209 | 27° C. (80° F.) | 0 |

[1]Percent based on maximum achievable hydration (activity) noted for each product.
[2]In SSU in thousands.

These data suggest that there may be an upper limit on the primary solution concentration requirement, and that it may be applicable to other groups of polymers as well. This may also be a viscosity limitation as solutions with higher viscosities may not flow uniformly through the blending system, causing localized excessive shear. Shear forces beyond the threshold for super-activation may also be necessary to disperse the higher viscosities.

There does not appear to be a lower limit on viscosity for purposes of super-activation. Primary concentrations as low as 0.4% with viscosities in the low hundred centipoises range have been successfully super-activated. While super-activating this lower concentration is possible, it may not be economically feasible unless the plant has a ready source of heated diluent. Due to the diverse hydration nature of polymers, it would be difficult to generalize concentration ranges as they relate to the super activation process. Therefore a better and more precise approach would be to quantify a primary solution viscosity range. A typical range could be as low as 100 SSU and as high as 500,000 SSU. A more specific range might be 1000 SSU to 200,000 SSU, and a more preferred range could be 300 SSU to 250,000 SSU.

In the process disclosed in U.S. Pat. No. 6,884,867, the primary high temperature and high viscosity solution was blended with cool diluent to a useful concentration, usually about 0.25%. In many cases, a plant process such as sludge thickening or paper fines retention will add additional dilution water (diluent) to the 0.25% solution prior to the process. This is referred to as post dilution and is a common practice in most industries. The amount of post dilution varies with the process but can be as high as 100:1.

The disclosed method includes the ability to automatically proportion the amount of polymer and dilution water to process demand. This is accomplished through the use of a microprocessor/controller that accepts external inputs from the plant process to adjust polymer dosing and automatically increases or decreases the speed of the neat polymer pump. Another feature allows the operator to select a final polymer concentration set point. The microprocessor tracks the total diluent (both primary and secondary) and adjusts the neat polymer pump to hold that set point.

For example, a concentration set point of 0.1% can be entered into the controller. The combined diluent flow is 20 gallons per minute (GPM) (2 GPM primary and 18 GPM secondary). The controller calculates that a neat polymer flow of about 75 mL/min is required to meet the 0.1% set point and automatically adjust the polymer pump speed to 75 mL/min. Any changes to the diluent water flow, either primary or secondary, will result in an adjustment to the polymer pump to maintain the set point. Another approach would include the addition of a diluent automatic rate controlling valve which could adjust the water flow in separately or in combination with the neat polymer pump.

The disclosed method allows for the ability to eliminate post dilution by simply adding more secondary diluent capacity to the process. This would be more efficient and practical from a control perspective. The operator can select a final target concentration without having to rely on downstream water sources that mostly are considered wild flow and are rarely controlled. This approach puts all flows into the microprocessor control loop with a final selectable concentration range of 0.001 to 2.0%.

The disclosed method also promotes the use of an external plant process input signal that allows for remote dosing control capability of the polymer based on the process demand. This input signal could be tied to plant flow, solids loading, production rates, or any process loop in communication with polymer demand.

The disclosed method provides an efficient and cost effective support frame. In the past, piping headers were used to direct water and solution flows to pumps, valves, and mixing tubes. These pipe headers mounted above the frame added to the overall system size and subsequent floor space requirements. Additionally, the static mixer elements used to blend the heated mixture with cold diluent extended the piping beyond the frame dimensions. The disclosed frames are now constructed from stainless steel tubing welded together to support the components and control panel. This approach to frame construction departs from the older method of using solid stainless plates formed in a pan configuration upon which the components and piping were attached. Using the inside of the welded frame tubing as conduits for water and chemicals has reduced the amount of external piping by 40-80%. This reduces the overall the size of the system, lowers the cost of materials and allows for more design flexibility. Inserting static mixer elements inside of the frame tubing has eliminated the need for adding additional external piping to the system. Accesses to the mixing elements are provided by removable plates welded to the end of the tubes. Inlets and outlets can be tapped virtually anywhere on the frame near to the components location. The frame conduit approach does not have to be limited to liquids, however. Process or instrument air can be provided to components through this unique and novel approach to frame utilization, as well.

Example 1—Prototype Super-Activation Polymer (SAP) System

This example describes a three step super-activation system (blend, recycle, pressure drop; no premix). A prototype unit was developed to meet a growing need to feed emulsion polyacrylamides directly "inline" to municipal wastewater treatment applications. In addition, many northern US municipalities have extremely cold make down water that hinders polymer inversion and slows the rate of polymer hydration. The prototype was designed and built as a make down unit to address this dual gap. The disclosed direct inline feeding of emulsion polyacrylamides has the potential to eliminate the need for transfer pumps, level probes, aging/run tanks, feed skids and tank mixers from the customer's site. There are a number of scenarios within a paper business globally where this could have significant positive financial impact.

As shown below, the prototype emulsion polyacrylamide make down system is capable of discharging a 0.25% polymer solution with performance that exceeds the same polymer/solids made down with an expensive make down unit utilizing shear and aged for 1 hour. The "Super Activated Polymer" (SAP) as referred to herein, works on the premise that a percentage of the cold make down water is preferably heated to 110° F. The warm water and polymer were combined in a mixing block and held in a small insulated vessel for about 2 minutes. The warm polymer was then post diluted with the same cold water source as it exits the make down unit through a static mixer. Samples taken at the discharge point exhibited better drainage and retention performance when compared with a traditionally made down polymer emulsion at equal solids that was aged in a run tank for one hour.

Materials and Methods: Thin Stock from Abitibi Bowater was used to evaluate MSR Drainage and filtrate turbidity using a cationic and anionic polyacrylamide, BFL594 & 565 respectively. 600 mL of a 1% consistency stock was added to the Britt jar and mixed for a total of 20 seconds at 1300 rpm. The Britt Jar mixing enabled the tester to place shear on the furnish and chemicals to approximate machine conditions. 600 mL of the treated stock was placed in the Modified Schopper Riegler and the time recorded as the filtrate was collected at 4 different volumes indicated on the graph. The composite filtrate sample was obtained at the 100 mL level and the turbidity measured and recorded as NTUs. The drainage and turbidity data was then utilized to compare the 3 stage SAP made polymer against the 1 hour aged polymer. The % Improvement was calculated using the raw turbidity and drainage data.

Example of % Improvement Calculation: BFL 594 Cationic Polyacrylamide

|  | Turbidity | % Improvement = $((698 - 467)/467) \times 100 = 33.1\%$ |
| --- | --- | --- |
| 1 Hr aged 594 | 698 |  |
| SAP Unit 594 | 467 |  |

Figure 7:
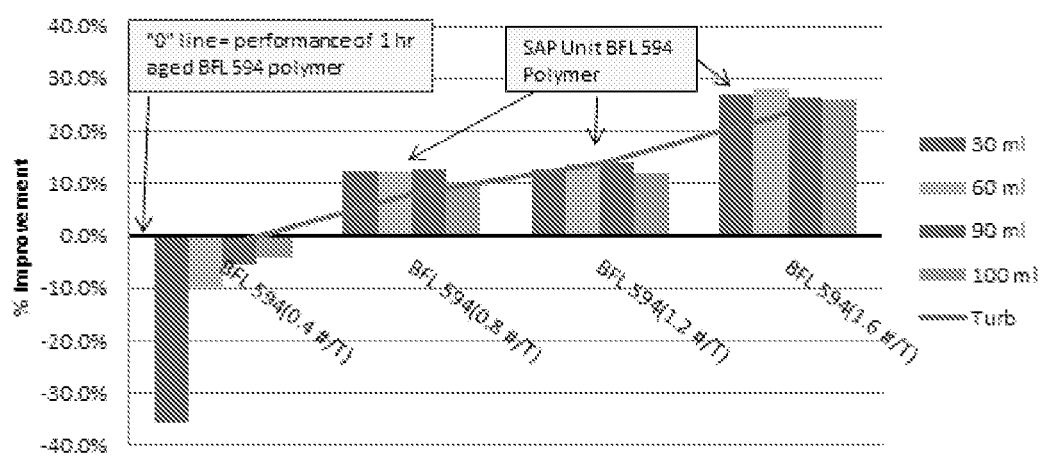
FIG. 7 is a graph comparing the results of super-activation of a cationic polyacrylamide versus standard activation of the cationic polyacrylamide.

FIG. 7 illustrates the comparison of the SAP Unit to the 1 hour aged polymer from the existing process. This data was generated using a cationic polyacrylamide—Bufloc 594. Retention as indicated by filtrate turbidity improvement improved from equal to 25% better at the higher application dosage. MSR drainage improved from −10% to 26% better over the dosage range. The zero-line in FIG. 7 represents the performance of the 1 hr aged polymer from the existing process. A positive % improvement means the SAP unit improved retention and/or drainage. A negative number below the zero line reflects a degradation in performance. As shown, both retention and drainage improved using the inline addition polymer direct from the SAP unit. Results improved with higher doses of the polymer (#/T=pounds per ton).

Figure 8:
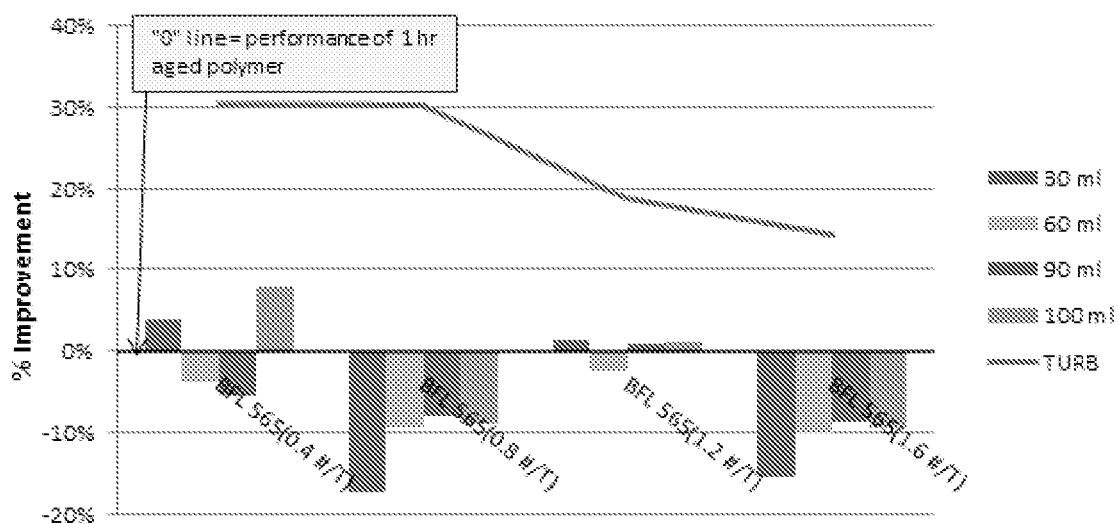
FIG. 8 is a graph comparing the results of super-activation of an anionic polyacrylamide versus standard activation of the anionic polyacrylamide.
Figure 9:
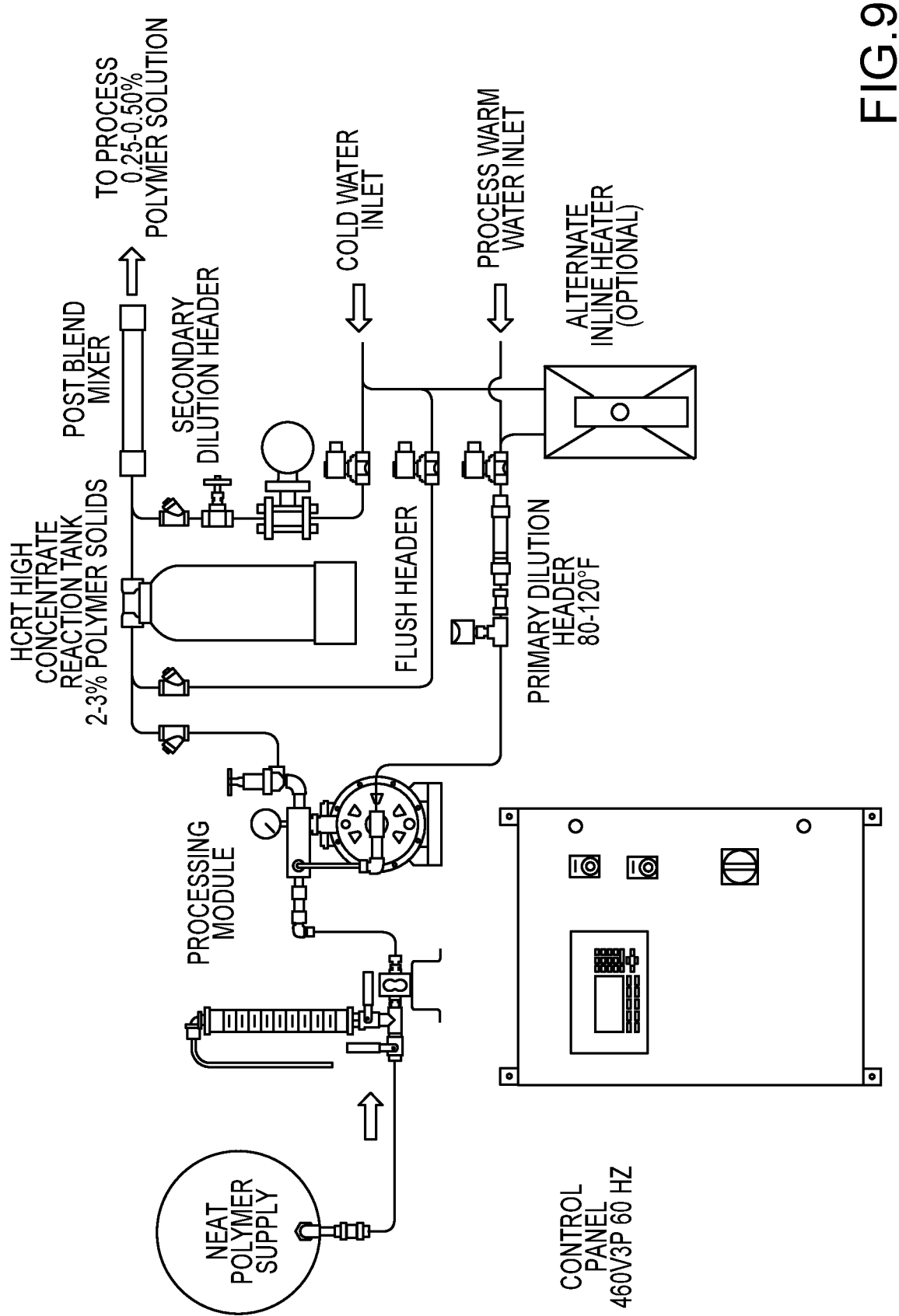
FIG. 9 is a schematic diagram of an apparatus that may be used for the super-activation process.

FIG. 8 illustrates the comparison of the SAP unit to the 1 hour aged polymer. This data was generated using a anionic polyacrylamide—Bufloc 565. The results differ from the cationic polyacrylamide but remain encouraging. Retention as indicated by filtrate turbidity improvement improved 30% at the lower dosages and leveled out at 15% better at the higher application dosage. MSR drainage was approximately equivalent ranging from −10% to +5% better over the dosage range. As shown, retention is better and drainage equal using the inline addition polymer direct from the SAP unit.

Example 2—Evaluation of Super-Activation Polymer (SAP) System in a Wastewater Treatment Plant The thermal preconditioning potential of the disclosed SAP processing system was determined in a municipal wastewater treatment plant. The system was arranged to a two stage super activation configuration using a combination of the "B" blending and "PD" pressure drop model for this test. Improvements in polymer response through inline thermal preconditioning and the ability to reduce polymer consumption without loss of performance were determined. Equipment efficiency was determined by solids comparison after centrifuge operation and dosage had been optimized.

The 2 stage SAP was shown to be superior to the existing Polyblend equipment resulting in 33% to 44% reduction in polymer usage without affecting the efficiency of the centrifuge.

The test site had one Polyblend system that injects directly into the centrifuge sludge feed line. For the test, the centrifuge was run at 70 GPM (a feedrate of 100 GPM is common). The preferred treatment plant solids target is 19%, although the plant data indicates a historical range of solids between (approximately) 14-21%. The SAP processing system installation was completed in about two hours. The existing Polyblend equipment was isolated from the centrifuge by means of a valve on the solution discharge line of the feeder. A separate ball valve was installed downstream and adjacent to the Polyblend system for the direct feed SAP solution line. The centrifuge received polymer from either system through the same feed line, via the isolation valves, and fed in the normal manner. To augment the test's uniformity, the Polyblend and SAP polymer systems were connected to the same neat polymer tote bin manifold.

The results of these tests are shown in Tables 4-6 below.

TABLE 4

| Polyblend | $H_2O^1$ | V/V Final % | Active %[2] | Cake Solids | Comments |
|---|---|---|---|---|---|
| 272 mL | 12 gpm | 0.6 | 0.24 | 18.74% | Normal start up, centrate clear |
| 255 mL | 11.6 gpm | 0.58 | 0.23 | 19.92% | Reduced polymer flow 7%, centrate clear |
| 230 mL | 12 gpm | 0.5 | 0.21 | 19.83% | Centrate color change, fine solids indicated |
| 215 mL | 12 gpm | 0.47 | 0.19 | NA | Heavy solids present in centrate, polymer dose increased to preserve centrifuge operation |

[1]inlet water temp 54° F.
[2]assumes 40% active polymer

TABLE 5

| SAP | $H_2O^1$ | V/V Final % | Active %[2] | Cake Solids | Comments |
|---|---|---|---|---|---|
| 222 mL | 12.0 GPM | 0.49 | 0.19 | 20.30% | Normal start up, centrate clear |
| 154 mL | 12.1 GPM | 0.34 | 0.13 | 20.59% | Reduced polymer flow 31%, centrate clear |
| 150 mL | 12.0 GPM | 0.33 | 0.13 | 18.24% | Centrate color change, fine solids indicated |
| 138 mL | 12.0 GPM | 0.31 | 0.12 | NA | Heavy solids present in centrate, polymer dose increased to preserve centrifuge operation |

[1]inlet water temp 54° F.
[2]assumes 40% active polymer

TABLE 6

| System | polymer dose | % cake solids | polymer reduction |
|---|---|---|---|
| Polyblend | 255 mL/min | 19.92 | 7% |
| SAP | 154 mL/min | 20.59 | 40% |

Example 3—Evaluation of SAP System in a Wastewater Treatment Plant

The thermal preconditioning potential of the disclosed SAP processing system was determined in another municipal wastewater treatment plant against an existing Norchem polymer processing system. The system was arranged to a three stage super activation configuration using a combination of the "B" blending, "R" recycle, and "PD" pressure drop model for this test. Improvements in polymer response through inline thermal preconditioning and the ability to eliminate the aging tanks without loss of performance were determined. The SAP was shown to be superior to the existing Norchem equipment resulting in elimination of the age tanks/pumps and in reducing polymer usage without affecting the efficiency of the filter press. See Tables 7-9.

The test site had two Norchem E-30 MVP systems that each feed into two discrete 500 gallon aging tanks based on level demand. Three polymer solution metering pumps with magnetic flowmeters, all pre-mounted to a welded frame, meter the aged polymer to two side by side Ashbrook belt filter presses that run concurrently. For the test, both presses would be fed digested sludge off a common digester and the South Press would be used for the SAP evaluation. The North press would be the control and continue to use aged polymer solution. The SAP installation was completed in approximately two hours. The existing solution metering pump injection fitting in the South press sludge line was isolated and replaced with the direct feed SAP solution line. The North press received polymer from the control (calibrated) age tank in the normal manner. To further augment the test's uniformity, the E-30 and SAP polymer systems were connected to the same neat polymer tote bin manifold.

TABLE 7

| Polymer | H20 | TEMP ° F. | FINAL % | TIME | COMMENTS |
|---|---|---|---|---|---|
| 100 ML | 10 GPM | 115 | 0.26 | 8:35 | Normal Start Up |
| 100 ML | 8.2 GPM | 122 | 0.32 | 9:25 | Increased Primary Temp |
| 90 ML | 7.2 GPM | 122 | 0.45 | 10:00 | Reduced Polymer Flow 10%, Good Drainage |
| 90 ML | 10 GPM | 122 | 0.24 | 10:02 | Reduced concentration, small performance loss |
| 90 ML | 7.0 GPM | 122 | 0.34 | 10:05 | Increased concentration, better performance |
| 90 ML | 6.0 GPM | 122 | 0.4 | 10:11 | Increased conc, no change-MP to 45 PSI |
| 90 ML | 8.0 GPM | 122 | 0.3 | 10:35 | Reduced conc, no improvement |
| 95 ML | 7.6 GPM | 122 | 0.33 | 11:02 | Increased polymer, improved drainage |
| 95 ML | 4.0 GPM | 122 | 0.62 | 12:10 | Increased conc, optimized performance |

TABLE 8

NORCHEM E-30 MVP Flow Equivalent Calculations Calculations

| | |
|---|---|
| age tank start | 225 gals |
| finish | 375 gals |
| elapsed time | 314 secs |
| volumetric displacement | 150 gals |
| e-30 flow rate | 28.6 gpm |
| e-30 drawdown auto 1 mode | 675 mL/min |
| solution concentration | 0.623% v/v |
| north press metering pump flow rate | 5.2 gpm |
| equivalent direct feed | 122.6 mL/min |
| in-line heater energy cost | 12° C. (53° F.) Δt = 15.5 kw; average daily usage: 6 hrs at 4.5¢ kw/hr = $4.20 |

TABLE 9

| System | poly dose | % cake solids | polymer reduction |
|---|---|---|---|
| E-30 NORTH PRESS | 122.6 ml/min | 14.81 | n/a |
| SOUTH PRESS (SAP) | 90 ml/min | 16.18 | 27% (90 mL/min) |
| SOUTH PRESS (SAP) | 95 ml/min | 16.18 | 23% (95 mL/min) |
| | average savings 25% | | |

Example 4—Evaluation of SAP System in a Wastewater Treatment Plant

The thermal preconditioning potential of the disclosed SAP Polymer Processing system was determined in another municipal wastewater treatment plant against an existing polymer processing system. The system was arranged to a three stage super activation configuration using a combination of the "B" blending, "R" recycle, and "PD" pressure drop model for this test. The feed flow to the centrifuge was 122-129 gallons/min, the sludge density was 1.05, and the sludge TSS was 1.5%. The SAP system achieved the same results at 120 mL/min as the control system at 190 mL/min. This represents a 37% reduction in dosage of the polymer. Testing results also determined that heating the primary water to a temperature of 48° C. was beneficial to achieving these results. The results are shown in Tables 10-13.

TABLE 10

| | | | | | | | | | |
|---|---|---|---|---|---|---|---|---|---|
| | | | | Polydyne C-6266 Polymer Feed | | | | | |
| | | Time | Sludge Flow | Dosage mL/min | lbs/dry ton | kg/ton | Pump Setting, % | Water Temp, ° C. | Primary Flow, L/m | Tot Flow, gpm |
| polyblend | 12:00 | 129 | 190 | 47.72 | 23.86 | | | | |
| SAP | 12:25 | 129 | 150 | 37.67 | 18.83 | 32 | 40 | 4 | 11 |
| | 1:05 | 129 | 130 | 32.65 | 16.32 | 28 | 40 | 4 | 11 |
| | 1:27 | 129 | 115 | 28.88 | 14.44 | 25 | 40 | 4 | 11 |
| | 1:40 | 129 | 115 | 28.88 | 14.44 | 25 | 40 | 4 | 11 |
| SAP | 9:00 | 129 | 130 | 32.65 | 16.32 | 28 | 40 | 4 | 11.5 |
| | 9:45 | 129 | 130 | 32.65 | 16.32 | 28 | 40 | 4 | 11.5 |
| polyblend | 10:00 | 129 | 190 | 47.72 | 23.86 | | | | |
| SAP | 9:20 | 122 | 185 | 49.11 | 24.55 | 40 | 40 | 4 | 13.3 |
| | 9:22 | 122 | 150 | 39.82 | 19.91 | 35 | 40 | 4 | 13.3 |
| | 9:45 | 129 | 150 | 37.66 | 18.83 | 35 | 40 | 4 | 13.3 |
| | 10:25 | 129 | 150 | 37.66 | 18.83 | 35 | 40 | 4 | 13.3 |
| | 10:27 | 129 | 150 | 37.66 | 18.83 | 35 | 40 | 4 | 13.3 |
| | 11:10 | 129 | 150 | 37.66 | 18.83 | 35 | 40 | 4 | 13.3 |
| | 11:45 | 129 | 150 | 37.66 | 18.83 | 35 | 40 | 4 | 13.3 |
| | 11:46 | 129 | 150 | 37.66 | 18.83 | 35 | 48 | 4 | 13.3 |
| | 12:45 | 129 | 150 | 37.66 | 18.83 | 35 | 48 | 4 | 13.3 |
| | 12:46 | 129 | 135 | 33.89 | 16.95 | 30 | 48 | 4 | 11.4 + 10 |
| | 1:10 | 129 | 135 | 33.89 | 16.95 | 30 | 48 | 4 | 11.4 + 10 |
| SAP | 9:00 | 124 | 120 | 31.34 | 15.67 | 26 | 48 | 4 | 12.4 + 6 |
| | 9:25 | 128 | 120 | 30.36 | 15.18 | 26 | 48 | 4 | 12.4 + 6 |
| | 9:26 | 128 | 105 | 26.57 | 13.28 | 23 | 48 | 4 | 12.4 + 6 |
| | 9:40 | 128 | 150 | 37.95 | 18.98 | 35 | 48 | 4 | 12.4 + 6 |
| Polyblend | 9:45 | 128 | 190 | 48.07 | 24.04 | | | | |
| | 10:10 | 128 | 150 | 37.95 | 18.98 | | | | |
| SAP | 11:25 | 127 | 120 | 30.60 | 15.30 | 26 | 48 | 3 | 12.8 + 6 |
| | 11:30 | 127 | 120 | 30.60 | 15.30 | 26 | 48 | 3 | 12.8 + 6 |
| | 11:32 | 127 | 110 | 28.05 | 14.02 | 24 | 48 | 3 | 12.8 + 6 |
| | 11:50 | 127 | 110 | 28.05 | 14.02 | 24 | 48 | 3 | 12.8 + 6 |
| | 11:51 | 127 | 110 | 28.05 | 14.02 | 24 | 35 | 3 | 12.8 + 6 |
| | 11:55 | 127 | 110 | 28.05 | 14.02 | 24 | 35 | 3 | 12.8 + 6 |
| | 11:56 | 127 | 110 | 28.05 | 14.02 | 24 | 48 | 2.5 | 12.8 + 6 |
| | 12:04 | 127 | 110 | 28.05 | 14.02 | 24 | 48 | 2.5 | 12.8 + 6 |
| | 12:05 | 127 | 120 | 30.60 | 15.30 | 26 | 48 | 2.5 | 12.8 + 6 |
| | 12:12 | 127 | 120 | 30.60 | 15.30 | 26 | 48 | 2.5 | 12.8 + 6 |
| | 12:17 | 127 | 120 | 30.60 | 15.30 | 26 | 40 | 2.5 | 12.8 + 6 |
| | 12:35 | 127 | 120 | 30.60 | 15.30 | 26 | 40 | 2.5 | 12.8 + 6 |
| | 12:37 | 127 | 110 | 28.05 | 14.02 | 24 | 40 | 2.5 | 12.8 + 6 |
| | 12:42 | 127 | 110 | 28.05 | 14.02 | 24 | 40 | 2.5 | 12.8 + 6 |
| | 1:00 | 127 | 110 | 28.05 | 14.02 | 24 | 40 | 2.5 | 12.8 + 6 |

| | Time | Injection Location | % Moisture | % Solids |
|---|---|---|---|---|
| polyblend | 12:00 | Middle | 81.50% | 18.50% |
| SAP | 12:25 | Middle | 81.90% | 18.10% |
| | 1:05 | Middle | 82.10% | 17.90% |
| | 1:27 | Middle | | |
| | 1:40 | Close | 81.75% | 18.25% |
| SAP | 9:00 | Close | | |
| | 9:45 | Close | 81.00% | 19.00% |
| polyblend | 10:00 | | | |
| SAP | 9:20 | Middle | 80.00% | 20.00% |
| | 9:22 | Middle | | |
| | 9:45 | Middle | 81.15% | 18.85% |
| | 10:25 | Middle | 82.30% | 17.70% |
| | 10:27 | Close | | |

TABLE 10-continued

| | | Polydyne C-6266 Polymer Feed | | |
|---|---|---|---|---|
| | 11:10 | Close | 81.30% | 18.70% |
| | 11:45 | Close | 79.70% | 20.30% |
| | 11:46 | Close | | |
| | 12:45 | Close | 80.70% | 19.30% |
| | 12:46 | Close | | |
| | 1:10 | Close | 82.00% | 18.00% |
| SAP | 9:00 | Close | | |
| | 9:25 | Close | 81.50% | 18.50% |
| | 9:26 | Close | | |
| | 9:40 | Close | | |
| Polyblend | 9:45 | Middle | | |
| | 10:10 | Middle | 81.85% | 18.15% |
| SAP | 11:25 | Close | | |
| | 11:30 | Close | | |
| | 11:32 | Close | | |
| | 11:50 | Close | 83.60% | 16.40% |
| | 11:51 | Close | | |
| | 11:55 | Close | | |
| | 11:56 | Close | | |
| | 12:04 | Close | | |
| | 12:05 | Close | | |
| | 12:12 | Close | | |
| | 12:17 | Close | | |
| | 12:35 | Close | | |
| | 12:37 | Close | | |
| | 12:42 | Close | | |
| | 1:00 | Close | 84.10% | 15.90% |

TABLE 11

| | | | Hydrex-6562 Polymer Feed | | | | | | |
|---|---|---|---|---|---|---|---|---|---|
| | Time | Sludge Flow | Dosage mL/min | lbs/dry ton | kg/ton | Pump Setting, % | Water Temp, C. | Primary Flow, L/m | Tot Flow, gpm |
| SAP | 2:00 | 122 | 150 | 39.83 | 19.92 | 32 | 52 | 4 | 11.5 |
| | 2:20 | 122 | 150 | 39.83 | 19.92 | 32 | 52 | 4 | 11.5 |
| | 2:21 | 122 | 140 | 37.18 | 18.59 | 29 | 52 | 4 | 11.5 |
| | 2:30 | 122 | 160 | 42.49 | 21.24 | 35 | 52 | 4 | 11.5 |
| | 2:35 | 122 | 170 | 45.14 | 22.57 | 37 | 52 | 4 | 11.5 |
| | 2:55 | 122 | 170 | 45.14 | 22.57 | 37 | 52 | 4 | 11.5 |
| polyblend | 3:00 | 122 | 190 | 50.45 | 25.23 | | | | |

| | Time | Injection Location | % Moisture | % Solids |
|---|---|---|---|---|
| SAP | 2:00 | Middle | | |
| | 2:20 | Middle | | |
| | 2:21 | Middle | | |
| | 2:30 | Middle | 83.20% | 16.80% |
| | 2:35 | Close | | |
| | 2:55 | Close | 80.90% | 19.10% |
| polyblend | 3:00 | Middle | | |

TABLE 12

| | | | Hydrex-6612 Polymer Feed | | | | | | |
|---|---|---|---|---|---|---|---|---|---|
| | Time | Sludge Flow | Dosage mL/min | lbs/dry ton | kg/ton | Pump Setting, % | Water Temp, C. | Primary Flow, L/m | Tot Flow, gpm |
| SAP | 10:15 | 128 | 120 | 30.36 | 15.18 | 26 | 48 | 4 | 13.5 + 6 |
| | 10:20 | 127 | 135 | 34.42 | 17.21 | 30 | 48 | 4 | 13.5 + 6 |
| | 10:25 | 127 | 135 | 34.42 | 17.21 | 30 | 48 | 4 | 13.5 + 6 |
| | 10:30 | 127 | 135 | 34.42 | 17.21 | 30 | 40 | 4 | 13.5 + 6 |

TABLE 12-continued

Hydrex-6612 Polymer Feed

|  | Time | Injection Location | % Moisture | % Solids |
|---|---|---|---|---|
| SAP | 10:15 | Close | | |
|  | 10:20 | Close | | |
|  | 10:25 | Middle | | |
|  | 10:30 | Close | | |

TABLE 13

Hydrex-66801 Polymer Feed

|  | Time | Sludge Flow | Dosage mL/min | lbs/dry ton | kg/ton | Pump Setting, % | Water Temp, C. | Primary Flow, L/m | Tot Flow, gpm |
|---|---|---|---|---|---|---|---|---|---|
| SAP | 10:50 | 127 | 135 | 34.42 | 17.21 | 30 | 48 | 4 | 13.5 + 6 |
|  | 10:55 | 127 | 135 | 34.42 | 17.21 | 30 | 48 | 4 | 13.5 + 6 |
|  | 11:00 | 127 | 120 | 30.60 | 15.30 | 26 | 48 | 4 | 13.5 + 6 |
|  | 11:05 | 127 | 128 | 32.64 | 16.32 | 28 | 48 | 4 | 13.5 + 6 |
|  | 11:10 | 127 | 128 | 32.64 | 16.32 | 28 | 48 | 4 | 13.5 + 6 |
|  | 11:15 | 127 | 135 | 34.42 | 17.21 | 30 | 48 | 4 | 13.5 + 6 |

|  | Time | Injection Location | % Moisture | % Solids |
|---|---|---|---|---|
| SAP | 10:50 | Close | | |
|  | 10:55 | Close | | |
|  | 11:00 | Close | | |
|  | 11:05 | Close | | |
|  | 11:10 | Close | | |
|  | 11:15 | Close | | |

Example 5—Evaluation of SAP System in a Wastewater Treatment Plant

The thermal preconditioning potential of the disclosed SAP Polymer Processing system was determined in another municipal wastewater treatment plant against an existing conventional polymer processing system. The system was arranged to a three stage super activation configuration using a combination of the "B" blending, "R" recycle, and "PD" pressure drop model for this test. The feed flow to the centrifuge was 48 gallons/min, the sludge density was 1.1, and the sludge % solids was assumed to be 2.0%. The system set-up included a primary temperature of 52° C., a primary flow of 3.8-4 L/min, and a total flow of 5.7-7.8 gallons/min. The results are shown in Table 14.

TABLE 14

|  | Time | Dosage Mls/min | lbs/dry ton | kg/ton | Pump Setting, % | Initial Weight | Final Weight | % Moisture | % Solids |
|---|---|---|---|---|---|---|---|---|---|
| | | K111L Polymer Feed | | | | | Sludge | | |
| LMI | 11:05 | 80 | 29.95 | 14.97 | | 3.01 | 0.69 | 77.05% | 22.95% |
| SAP | 11:45 | 90 | | | 20 | | | | |
|  | 11:50 | 65 | | | 15 | | | | |
|  | 12:35 | 50 | 16.52 | 8.26 | 13 | 3.04 | 0.79 | 74.00% | 26.00% |
|  | 12:45 | 45 | | | 11 | | | | |
|  | 12:50 | 35 | | | 9 | | | | |
|  | 12:55 | 25 | 8.82 | 4.41 | 7 | 2.92 | 0.71 | 75.65% | 24.35% |
|  | 13:00 | 15 | | 0.00 | 5 | | | | |
|  | 13:05 | 5 | 1.91 | 0.95 | 3 | 3.25 | 0.73 | 77.50% | 22.50% |
| | | Hydrex 3741 Polymer Feed | | | | | Sludge | | |
| SAP | 9:50 | 50 | | | 13 | | | | |
|  | 9:55 | 32 | | | 8 | | | | |
|  | 10:00 | 27 | 9.39 | 4.70 | 7 | 3.04 | 0.75 | 75.30% | 24.70% |
|  | 10;05 | 15 | 4.97 | 2.48 | 5 | 3.01 | 0.78 | 74.05% | 25.95% |
|  | 10:15 | 11 | 4.30 | 2.15 | 4 | 3.00 | 0.66 | 78.00% | 22.00% |
|  | 10:32 | 5 | | | 3 | | | | |
|  | 10:47 | 2 | 0.73 | 0.37 | 2 | 2.96 | 0.69 | 76.50% | 23.50% |

It is understood that the disclosure may embody other specific forms without departing from the spirit or central characteristics thereof. The disclosure of aspects and embodiments, therefore, are to be considered in all respects as illustrative and not restrictive, and the claims are not to be limited to the details given herein. Accordingly, while specific embodiments have been illustrated and described, numerous modifications come to mind without significantly departing from the spirit of the invention and the scope of protection is only limited by the scope of the accompanying claims. Unless noted otherwise, all percentages listed herein are weight percentages.

For reasons of completeness, various aspects of the present disclosure are set out in the following numbered clauses:

Clause 1. A polymer super-activation method comprising: heating a diluent to an elevated temperature; combining a polymer and the heated diluent to form a first polymer-diluent mixture, wherein the first polymer-diluent mixture has a first concentration of polymer to diluent;
carrying out a one to three-step polymer activation process to form an activated polymer-diluent mixture, the steps selected from (a)-(d): (a) premixing the first polymer-diluent mixture at a predetermined pressure to form a second polymer-diluent mixture; (b) blending the first polymer-diluent mixture or the second polymer-diluent mixture with a blending device to form a blended polymer-diluent mixture; (c) (i) recycling the blended polymer-diluent mixture to be blended as in step (b) or premixed as in step (a) at a predetermined pressure; or (ii) recycling the second polymer-diluent mixture to be premixed as in step (a) at a predetermined pressure; and (d) reducing the pressure in a portion of the blended polymer-diluent mixture or the second polymer-diluent mixture to relax the polymer and form a relaxed polymer-diluent mixture; diluting the activated polymer-diluent mixture, said diluted activated polymer-diluent mixture having a temperature lower than said elevated temperature and a second concentration of polymer to diluent lower than the first concentration; wherein the activated polymer-diluent mixture is selected from: the second polymer-diluent mixture, the blended polymer-diluent mixture, and the relaxed polymer-diluent mixture; and passing the diluted activated polymer-diluent mixture to an output, preferably passing the diluted activated polymer-diluent mixture to an output.

Clause 2. The polymer super-activation method of clause 1, wherein the one to three-step polymer activation process to form an activated polymer-diluent mixture is a three-step polymer activation process, the steps being: (b) blending the first polymer-diluent mixture with a blending device to form a blended polymer-diluent mixture; (c) recycling the blended polymer-diluent mixture to be blended as in step (b); and (d) reducing the pressure in a portion of the blended polymer-diluent mixture to relax the polymer and form a relaxed polymer-diluent mixture; wherein the activated polymer-diluent mixture is the relaxed polymer-diluent mixture.

Clause 3. The polymer super-activation method of clause 1, wherein the one to three-step polymer activation process to form an activated polymer-diluent mixture is a three-step polymer activation process, the steps being: (a) premixing the first polymer-diluent mixture at a predetermined pressure to form a second polymer-diluent mixture; (c) recycling the second polymer-diluent mixture to be premixed as in step (a) at a predetermined pressure; and (d) reducing the pressure in the second polymer-diluent mixture to relax the polymer and form a relaxed polymer-diluent mixture; wherein the activated polymer-diluent mixture is the relaxed polymer-diluent mixture.

Clause 4. The polymer super-activation method of clause 1, wherein the one to three-step polymer activation process to form an activated polymer-diluent mixture is a three-step polymer activation process, the steps being: (a) premixing the first polymer-diluent mixture at a predetermined pressure to form a second polymer-diluent mixture; (b) blending the first polymer-diluent mixture or the second polymer-diluent mixture with a blending device to form a blended polymer-diluent mixture; and (d) reducing the pressure in a portion of the blended polymer-diluent mixture to relax the polymer and form a relaxed polymer-diluent mixture; wherein the activated polymer-diluent mixture is the relaxed polymer-diluent mixture.

Clause 5. The polymer super-activation method of clause 1, wherein the one to three-step polymer activation process to form an activated polymer-diluent mixture is a three-step polymer activation process, the steps being: (a) premixing the first polymer-diluent mixture at a predetermined pressure to form a second polymer-diluent mixture; (b) blending the first polymer-diluent mixture or the second polymer-diluent mixture with a blending device to form a blended polymer-diluent mixture; and (c) recycling the blended polymer-diluent mixture to be blended as in step (b); wherein the activated polymer-diluent mixture is the blended polymer-diluent mixture.

Clause 6. The polymer super-activation method of clause 1, wherein the one to three-step polymer activation process to form an activated polymer-diluent mixture is a two-step polymer activation process, the steps being: (a) premixing the first polymer-diluent mixture at a predetermined pressure to form a second polymer-diluent mixture; and (b) blending the first polymer-diluent mixture or the second polymer-diluent mixture with a blending device to form a blended polymer-diluent mixture; wherein the activated polymer-diluent mixture is the blended polymer-diluent mixture.

Clause 7. The polymer super-activation method of clause 1, wherein the one to three-step polymer activation process to form an activated polymer-diluent mixture is a two-step polymer activation process, the steps being: (a) premixing the first polymer-diluent mixture at a predetermined pressure to form a second polymer-diluent mixture; and (c) recycling the second polymer-diluent mixture to be premixed as in step (a) at a predetermined pressure; wherein the activated polymer-diluent mixture is the second polymer-diluent mixture.

Clause 8. The polymer super-activation method of clause 1, wherein the one to three-step polymer activation process to form an activated polymer-diluent mixture is a two-step polymer activation process, the steps being: (a) premixing the first polymer-diluent mixture at a predetermined pressure to form a second polymer-diluent mixture; and (d) reducing the pressure in a portion of the second polymer-diluent mixture to relax the polymer and form a relaxed polymer-diluent mixture; wherein the activated polymer-diluent mixture is the relaxed polymer-diluent mixture.

Clause 9. The polymer super-activation method of clause 1, wherein the one to three-step polymer activation process to form an activated polymer-diluent mixture is a two-step polymer activation process, the steps being: (b) blending the first polymer-diluent mixture with a blending device to form a blended polymer-diluent mixture; and (c) recycling the blended polymer-diluent mixture to be blended as in step (b); wherein the activated polymer-diluent mixture is the blended polymer-diluent mixture.

Clause 10. The polymer super-activation method of clause 1, wherein the one to three-step polymer activation process to form an activated polymer-diluent mixture is a two-step polymer activation process, the steps being: (b) blending the first polymer-diluent mixture with a blending device to form a blended polymer-diluent mixture; and (d) reducing the pressure in a portion of the blended polymer-diluent mixture to relax the polymer and form a relaxed polymer-diluent mixture; wherein the activated polymer-diluent mixture is the blended polymer-diluent mixture.

Clause 11. The polymer super-activation method of clause 1, wherein the one to three-step polymer activation process to form an activated polymer-diluent mixture is a one-step polymer activation process, the step being: (a) premixing the first polymer-diluent mixture at a predetermined pressure to form a second polymer-diluent mixture; wherein the activated polymer-diluent mixture is the second polymer-diluent mixture.

Clause 12. The polymer super-activation method of clause 1, wherein the one to three-step polymer activation process to form an activated polymer-diluent mixture is a one-step polymer activation process, the step being: (b) blending the first polymer-diluent mixture or the second polymer-diluent mixture with a blending device to form a blended polymer-diluent mixture; wherein the activated polymer-diluent mixture is the blended polymer-diluent mixture.

Clause 13. The polymer super-activation method of clause 1, wherein the one to three-step polymer activation process to form an activated polymer-diluent mixture is a one-step polymer activation process, the step being: (d) reducing the pressure in a portion of the first polymer-diluent mixture to form a relaxed polymer-diluent mixture; wherein the activated polymer-diluent mixture is the relaxed polymer-diluent mixture.

Clause 14. The polymer super-activation method of any one of clauses 1-13, wherein the first concentration of polymer to diluent is, by weight, about 0.2-4% polymer to about 96-99.8% diluent, about 0.1-5% polymer to about 95-99.9% diluent, about 0.5-6% polymer to about 94-99.5% diluent, about 0.5-5% polymer to about 95-99.5% diluent, about 0.2-4% polymer to about 96-99.8% diluent, about 0.5-4% polymer to about 96-99.5% diluent, about 0.5-3% polymer to about 97-99.5% diluent, about 0.5-2% polymer to about 98-99.5% diluent, or about 0.5-1% polymer to about 99-99.5% diluent.

Clause 15. The polymer super-activation method of any one of clauses 1-14, wherein the first polymer-diluent mixture has a viscosity in the range of about 100 SSU to about 500,000 SSU, about 100 SSU to about 400,000 SSU, about 100 SSU to about 300,000 SSU, about 100 SSU to about 200,000 SSU, about 300 SSU to about 500,000 SSU, about 300 SSU to about 400,000 SSU, about 300 SSU to about 300,000 SSU, about 300 SSU to about 250,000 SSU, about 1,000 SSU to about 200,000 SSU, or about 250,000 SSU to about 500,000 SSU.

Clause 16. The polymer super-activation method of any of clauses 1-15, wherein the first polymer-diluent mixture has a viscosity of about 300 SSU to about 250,000 SSU.

Clause 17. The polymer super-activation method of any of clauses 1-16, wherein the elevated temperature is about 15° C. to about 60° C., about 20° C. to about 60° C., about 25° C. to about 60° C., about 30° C. to about 60° C., about 35° C. to about 60° C., about 40° C. to about 60° C., about 45° C. to about 60° F., about 50° C. to about 60° C., about 15° C. to about 55° C., about 15° C. to about 50° C., about 15° C. to about 45° C., about 15° C. to about 40° C., about 15° C. to about 35° C., about 15° C. to about 30° C., about 20° C. to about 50° C., about 25° C. to about 50° C., about 30° C. to about 50° C., about 35° C. to about 55° C., about 35° C. to about 50° C., about 25° C. to about 40° C., or about 25° F. to about 35° C.

Clause 18. The polymer super-activation method of any of clauses 1-17, wherein the blending device used for blending has a rotor speed of about 500 RPM to about 4000 RPM, about 1000 RPM to about 4000 RPM, about 1500 RPM to about 4000 RPM, about 2000 RPM to about 4000 RPM, about 2500 RPM to about 4000 RPM, about 3000 RPM to about 4000 RPM, about 4000 RPM, about 3500 RPM to about 4000 RPM, about 500 RPM to about 3000 RPM, about 500 RPM to about 2000 RPM, about 500 RPM to about 1000 RPM, about 1000 RPM to about 3000 RPM, about 1000 RPM to about 2000 RPM, about 2000 RPM to about 4000 RPM, or about 2000 RPM to about 3000 RPM.

Clause 19. The polymer super-activation method of any of clauses 1-18, wherein the blending device is a flow limited bladed rotor device.

Clause 20. The polymer super-activation method of clause 19, wherein the flow limited bladed rotor device is a derated centrifugal pump, an inline blender, or a multiple stage centrifugal pump.

Clause 21. The polymer super-activation method of any of clauses 1-20, wherein the predetermined pressure is about 5 psi to about 100 psi, about 5 psi to about 80 psi, about 10 psi to about 80 psi, about, about 30 psi to about 65 psi, or about 40 psi to about 50 psi.

Clause 22. The polymer super-activation method of any of clauses 1-21, wherein the second concentration of polymer to diluent is, by weight, about 0.001-2.0% polymer to about 98.0-99.999% diluent, about 0.001-4.0% polymer to about 96.0-99.999% diluent, about 0.001-3.0% polymer to about 97.0-99.999% diluent, about 0.001-2.0% polymer to about 98.0-99.999% diluent, about 0.001-1.0% polymer to about 99.0-99.999% diluent, or about 0.001-0.5% polymer to about 99.5-99.999% diluent.

Clause 23. The polymer super-activation method of any of clauses 1-22, wherein passing the diluted activated polymer-diluent mixture to an output comprises passing the diluted activated polymer-diluent mixture through a mixer to the output.

Clause 24. The polymer super-activation method of any of clauses 1-23, wherein the diluent is water.

Clause 25. A method of identifying the combined mechanical and thermal energy to super-activate a polymer, the method comprising: heating a diluent to an elevated temperature; combining a polymer and the heated diluent to form a first polymer-diluent mixture, wherein the first polymer-diluent mixture has a first concentration of polymer to diluent; carrying out a one to three-step polymer activation process to form an activated polymer-diluent mixture, the steps selected from (a)-(d): (a) premixing the first polymer-diluent mixture at a predetermined pressure to form a second polymer-diluent mixture; (b) blending the first polymer-diluent mixture or the second polymer-diluent mixture with a blending device to form a blended polymer-diluent mixture; (c) (i) recycling the blended polymer-diluent mixture to be blended as in step (b) or premixed as in step (a) at a predetermined pressure; or (ii) recycling the second polymer-diluent mixture to be premixed as in step (a) at a predetermined pressure; and (d) reducing the pressure in a portion of the blended polymer-diluent mixture or the second polymer-diluent mixture to relax the polymer and form a relaxed polymer-diluent mixture; diluting the activated polymer-diluent mixture, said diluted activated polymer-diluent mixture having a temperature lower than said elevated temperature and a second concentration of polymer to diluent lower than the first concentration; wherein the activated polymer-diluent mixture is selected from: the second polymer-diluent mixture, the blended polymer-diluent mixture, and the relaxed polymer-diluent mixture; passing the diluted activated polymer-diluent mixture to an output, preferably passing the diluted activated polymer-diluent mixture to an output; assessing the level of super-activation of the polymer relative to baseline hydrated endpoints; and adjusting one or more steps of the one to three-step process to improve super-activation.

What is claimed is:

1. A polymer super-activation method comprising:
heating a diluent to an elevated temperature;
combining a polymer and the heated diluent to form a first polymer-diluent mixture, wherein the first polymer-diluent mixture has a first concentration of polymer to diluent;
carrying out a polymer activation process on the first polymer-diluent mixture without a static mixer, to form an activated polymer-diluent mixture, the polymer activation process including:
 (a) blending the first polymer-diluent mixture with a blending device at a rotational speed from 500 rotations per minute (RPM) to 4000 RPM to form a blended polymer-diluent mixture;
 (b) optionally recycling the blended polymer-diluent mixture by combining the blended polymer-diluent mixture with the first polymer-diluent mixture and thereafter blending as in step (a); and
 (c) optionally performing a pressure drop on a portion of the blended polymer-diluent mixture to relax the polymer and form a relaxed polymer-diluent mixture;
diluting the activated polymer-diluent mixture to produce a diluted activated polymer-diluent mixture, said diluted activated polymer-diluent mixture having a temperature lower than said elevated temperature and a second concentration of polymer to diluent lower than the first concentration; wherein the activated polymer-diluent mixture is selected from the group consisting of the blended polymer-diluent mixture and the relaxed polymer-diluent mixture; and
passing the diluted activated polymer-diluent mixture to an output.

2. The method of claim 1, wherein the first concentration of polymer to diluent is, by weight, about 0.2-4% polymer to about 96-99.8% diluent.

3. The method of claim 1, wherein the elevated temperature is about 15° C. to about 60° C.

4. The method of claim 1, wherein the blending device is a flow limited bladed rotor device.

5. The method of claim 4, wherein the flow limited bladed rotor device is a derated centrifugal pump, an inline blender, or a multiple stage centrifugal pump.

6. The method of claim 1, wherein the second concentration of polymer to diluent is, by weight, about 0.001-2.0% polymer to about 98.0-99.999% diluent.

7. The method of claim 1, wherein passing the diluted activated polymer-diluent mixture to an output comprises passing the diluted activated polymer-diluent mixture through a mixer to the output.

8. The method of claim 1, wherein the diluent is water.

9. The method of claim 1, wherein the polymer activation process includes:
 (a) blending the first polymer-diluent mixture with a blending device at a rotational speed from 500 rotations per minute (RPM) to 4000 RPM to form a blended polymer-diluent mixture; and
 (b) recycling the blended polymer-diluent mixture by combining the blended polymer-diluent mixture with the first polymer-diluent mixture and thereafter blending as in step (a).

10. The method of claim 9, wherein the first concentration of polymer to diluent is, by weight, about 0.2-4% polymer to about 96-99.8% diluent.

11. The method of claim 9, wherein the elevated temperature is about 15° C. to about 60° C.

12. The method of claim 9, wherein the second concentration of polymer to diluent is, by weight, about 0.001-2.0% polymer to about 98.0-99.999% diluent.

13. The method of claim 1, wherein the polymer activation process includes:
 (a) blending the first polymer-diluent mixture with a blending device at a rotational speed from 500 rotations per minute (RPM) to 4000 RPM to form a blended polymer-diluent mixture; and
 (c) performing a pressure drop on a portion of the blended polymer-diluent mixture to relax the polymer and form a relaxed polymer-diluent mixture.

14. The method of claim 13, wherein the first concentration of polymer to diluent is, by weight, about 0.2-4% polymer to about 96-99.8% diluent.

15. The method of claim 13, wherein the elevated temperature is about 15° C. to about 60° C.

16. The method of claim 13, wherein the second concentration of polymer to diluent is, by weight, about 0.001-2.0% polymer to about 98.0-99.999% diluent.

17. The method of claim 1, wherein the polymer activation process includes:
 (a) blending the first polymer-diluent mixture with a blending device at a rotational speed from 500 rotations per minute (RPM) to 4000 RPM to form a blended polymer-diluent mixture;
 (b) recycling the blended polymer-diluent mixture by combining the blended polymer-diluent mixture with the first polymer-diluent mixture and thereafter blending as in step (a); and
 (c) performing a pressure drop of about 5 psi to about 100 psi on a portion of the blended polymer-diluent mixture to relax the polymer and form a relaxed polymer-diluent mixture.

18. The method of claim 17, wherein the first concentration of polymer to diluent is, by weight, about 0.2-4% polymer to about 96-99.8% diluent.

19. The method of claim 17, wherein the elevated temperature is about 15° C. to about 60° C.

20. The method of claim 17, wherein the second concentration of polymer to diluent is, by weight, about 0.001-2.0% polymer to about 98.0-99.999% diluent.

* * * * *